(12) United States Patent
You

(10) Patent No.: US 12,351,210 B2
(45) Date of Patent: Jul. 8, 2025

(54) VEHICLE-BASED DATA PROCESSING METHOD AND APPARATUS, COMPUTER, AND STORAGE MEDIUM

(71) Applicant: Tencent Technology (Shenzhen) Company Limited, Shenzhen (CN)

(72) Inventor: Changxi You, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 347 days.

(21) Appl. No.: 17/971,495

(22) Filed: Oct. 21, 2022

(65) Prior Publication Data

US 2023/0053459 A1 Feb. 23, 2023

Related U.S. Application Data

(63) Continuation of application No. PCT/CN2021/116193, filed on Sep. 2, 2021.

(30) Foreign Application Priority Data

Sep. 10, 2020 (CN) .......................... 202010947834.9

(51) Int. Cl.
*B60W 30/095* (2012.01)
*B60W 40/04* (2006.01)
(Continued)

(52) U.S. Cl.
CPC .... *B60W 60/0011* (2020.02); *B60W 30/0956* (2013.01); *B60W 40/04* (2013.01);
(Continued)

(58) Field of Classification Search
CPC ......... B60W 50/0097; B60W 30/0956; B60W 40/04; B60W 60/0011; B60W 30/18163;
(Continued)

(56) References Cited

U.S. PATENT DOCUMENTS

2014/0195093 A1* 7/2014 Litkouhi ......... B60W 30/18163
701/23
2017/0291603 A1 10/2017 Nakamura
(Continued)

FOREIGN PATENT DOCUMENTS

| CN | 108313054 A | 7/2018 |
|---|---|---|
| CN | 108595823 A | 9/2018 |

(Continued)

OTHER PUBLICATIONS

Machine translation of the description of CN-110298131-A, Yang et al., Oct. 1, 2019, pp. 1-19 (Year: 2024).*

(Continued)

*Primary Examiner* — Navid Z. Mehdizadeh
*Assistant Examiner* — Jared C Bean
(74) *Attorney, Agent, or Firm* — Morgan, Lewis & Bockius LLP

(57) ABSTRACT

Embodiments of this application disclose a vehicle-based data processing method performed by a computer device. The method includes: determining at least two predicted offsets of a first vehicle, a first traveling state of the first vehicle, and a second traveling state of a second vehicle; determining, according to the first traveling state and the second traveling state, first lane change payoffs of the predicted offsets when the second vehicle is in a yielding prediction state, and determining second lane change payoffs when the second vehicle is in a non-yielding prediction state; and determining a predicted yielding probability of the second vehicle, generating target lane change payoffs of the predicted offsets according to the predicted yielding probability and the first lane change payoffs and the second lane change payoffs of the predicted offsets, and determining a predicted offset having a maximum target lane change payoff as a target predicted offset.

20 Claims, 11 Drawing Sheets

(51) Int. Cl.
  *B60W 50/00*    (2006.01)
  *B60W 60/00*    (2020.01)
  *G06N 5/01*     (2023.01)

(52) U.S. Cl.
  CPC .... *B60W 50/0097* (2013.01); *B60W 60/0015* (2020.02); *B60W 60/00274* (2020.02); *G06N 5/01* (2023.01); *B60W 2554/4041* (2020.02); *B60W 2554/4045* (2020.02); *B60W 2554/406* (2020.02); *B60W 2554/801* (2020.02); *B60W 2554/802* (2020.02); *B60W 2556/10* (2020.02)

(58) Field of Classification Search
  CPC ....... B60W 60/00274; B60W 60/0015; B60W 2554/802; B60W 2554/801; B60W 2554/4045; B60W 2554/4046; B60W 2554/406; B60W 2556/10; B60W 2554/4041; B60W 60/00; B60W 30/095; B60W 50/00; B60W 30/18; G06V 10/765; G06V 20/58; G06V 10/764; G06N 5/045; G06N 5/01; G06N 20/00; G06F 18/24323; G06F 18/243
  See application file for complete search history.

(56) References Cited

U.S. PATENT DOCUMENTS

| | | | |
|---|---|---|---|
| 2019/0265709 A1 | 8/2019 | Saikyo et al. | |
| 2019/0382019 A1 | 12/2019 | Abe et al. | |
| 2020/0310428 A1* | 10/2020 | Li | G05D 1/0088 |
| 2022/0063663 A1* | 3/2022 | Wolff | B60W 60/0027 |

FOREIGN PATENT DOCUMENTS

| | | | | |
|---|---|---|---|---|
| CN | 109739246 A | | 5/2019 | |
| CN | 110136254 A | | 8/2019 | |
| CN | 110298131 A | * 10/2019 | ........... G06K 9/6296 |
| CN | 110908375 A | | 3/2020 | |
| CN | 110910663 A | | 3/2020 | |
| CN | 111169476 A | | 5/2020 | |
| CN | 111383464 A | | 7/2020 | |
| CN | 111428943 A | | 7/2020 | |
| CN | 112406905 A | | 2/2021 | |
| EP | 3208786 A1 | | 8/2017 | |
| JP | 2022527072 A | | 5/2022 | |
| JP | 2022544715 A | | 10/2022 | |
| WO | WO 2019206377 A1 | | 10/2019 | |
| WO | WO 2020003578 A1 | | 1/2020 | |

OTHER PUBLICATIONS

Tencent Technology, ISR, PCT/CN2021/116193, Dec. 2, 2021, 3 pgs.
Tencent Technology (Shenzhen) Company Limited, EESR, EP 21865910.0, Sep. 28, 2023, 10 pgs.
Tencent Technology, WO, PCT/CN2021/116193, Dec. 2, 2021, 4 pgs.
Tencent Technology, IPRP, PCT/CN2021/116193, Mar. 7, 2023, 5 pgs.

* cited by examiner

VEHICLE-BASED DATA PROCESSING METHOD AND APPARATUS, COMPUTER, AND STORAGE MEDIUM

CROSS-REFERENCE TO RELATED APPLICATIONS

This application is a continuation application of PCT Patent Application No. PCT/CN2021/116193, entitled "VEHICLE-BASED DATA PROCESSING METHOD AND APPARATUS, COMPUTER, AND STORAGE MEDIUM" filed on Sep. 2, 2021, which claims priority to Chinese Patent Application No. 202010947834.9, filed with the State Intellectual Property Office of the People's Republic of China on Sep. 10, 2020, and entitled "VEHICLE-BASED DATA PROCESSING METHOD AND APPARATUS, COMPUTER, AND STORAGE MEDIUM", all of which are incorporated herein by reference in their entirety.

This application relates to U.S. patent application Ser. No. 17/970,468, entitled "DATA PROCESSING METHOD AND APPARATUS, DEVICE, AND STORAGE MEDIUM" filed on Oct. 20, 2022, which is incorporated herein by reference in its entirety.

FIELD OF THE TECHNOLOGY

This application relates to the field of computer technologies, and in particular, to a vehicle-based data processing method and apparatus, a computer, and a readable storage medium.

BACKGROUND OF THE DISCLOSURE

Autonomous vehicle, also referred to as a driverless vehicle, a computer driven vehicle, or the like, is a type of intelligent vehicle that realizes driverless driving by using a computer system. With the development of science and technology, the research and development of autonomous vehicles is increasingly wide. Driverless driving is generally divided into a $0^{th}$ level (level 0, L0) to a fifth level (level 5, L5), that is, from no autonomous to full autonomous. Existing autonomous vehicle technologies are generally based on a CT6 automated driving system of Cadillac or an autopilot system of Tesla. When an ego vehicle (a driverless vehicle) needs to change a lane, the ego vehicle can obtain an enough lane change space to change the lane with cooperation and yielding of environmental vehicles to a certain extent. Therefore, the key to lane change is whether the environmental vehicles yield to the ego vehicle, that is, the ego vehicle does not have right of way. However, during actual driving, not all vehicles will yield to the ego vehicle based on a turn light signal of the ego vehicle. Therefore, the lane change is usually triggered manually by a driver of the ego vehicle, or the ego vehicle waits for the environmental vehicles that need to drive into the lane to yield, to implement the lane change of the ego vehicle.

SUMMARY

Embodiments of this application provide a vehicle-based data processing method and apparatus, a computer, and a readable storage medium, which may improve lane change efficiency of a current vehicle.

An aspect of the embodiments of this application provides a vehicle-based data processing method, including:
  determining at least two predicted offsets of a first vehicle, a first traveling state of the first vehicle, and a second traveling state of a second vehicle, the second vehicle being a reference vehicle when the first vehicle changes a lane;
  determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state; and
  determining a predicted yielding probability of the second vehicle, generating target lane change payoffs of the predicted offsets according to the predicted yielding probability and the first lane change payoffs and the second lane change payoffs of the predicted offsets, and determining a predicted offset having a maximum target lane change payoff as a target predicted offset, the target predicted offset being used for representing a lateral lane change traveling distance predicted for the first vehicle.

An aspect of the embodiments of this application provides a vehicle-based data processing apparatus, including:
  a state obtaining module, configured to determine at least two predicted offsets of a first vehicle, a first traveling state of the first vehicle, and a second traveling state of a second vehicle, the second vehicle being a reference vehicle when the first vehicle changes a lane;
  a payoff obtaining module, configured to determine, according to the first traveling state and the second traveling state, first lane change payoffs of the predicted offsets when the second vehicle is in a yielding prediction state, and determine second lane change payoffs of the predicted offsets when the second vehicle is in a non-yielding prediction state; and
  an offset selection module, configured to determine a predicted yielding probability of the second vehicle, generate target lane change payoffs of the predicted offsets according to the predicted yielding probability and the first lane change payoffs and the second lane change payoffs of the predicted offsets, and determine a predicted offset having a maximum target lane change payoff as a target predicted offset, the target predicted offset being used for representing a lateral lane change traveling distance predicted for the first vehicle.

An aspect of the embodiments of this application provides a computer-readable storage medium, storing a computer program, the computer program including program instructions, the program instructions, when executed by a processor, performing the vehicle-based data processing method according to the aspect of the embodiments of this application.

An aspect of the embodiments of this application provides a computer program product or a computer program, including computer instructions stored in a computer-readable storage medium. A processor of a computer device reads the computer instructions from the computer-readable storage medium. The processor executes the computer instructions, to cause the computer device to perform the method provided in implementations in the aspect of the embodiments of this application.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from these accompanying drawings without creative efforts.

FIG. 1 is a network architecture diagram of vehicle-based data processing according to an embodiment of this application.

DESCRIPTION OF EMBODIMENTS

Figure 1:
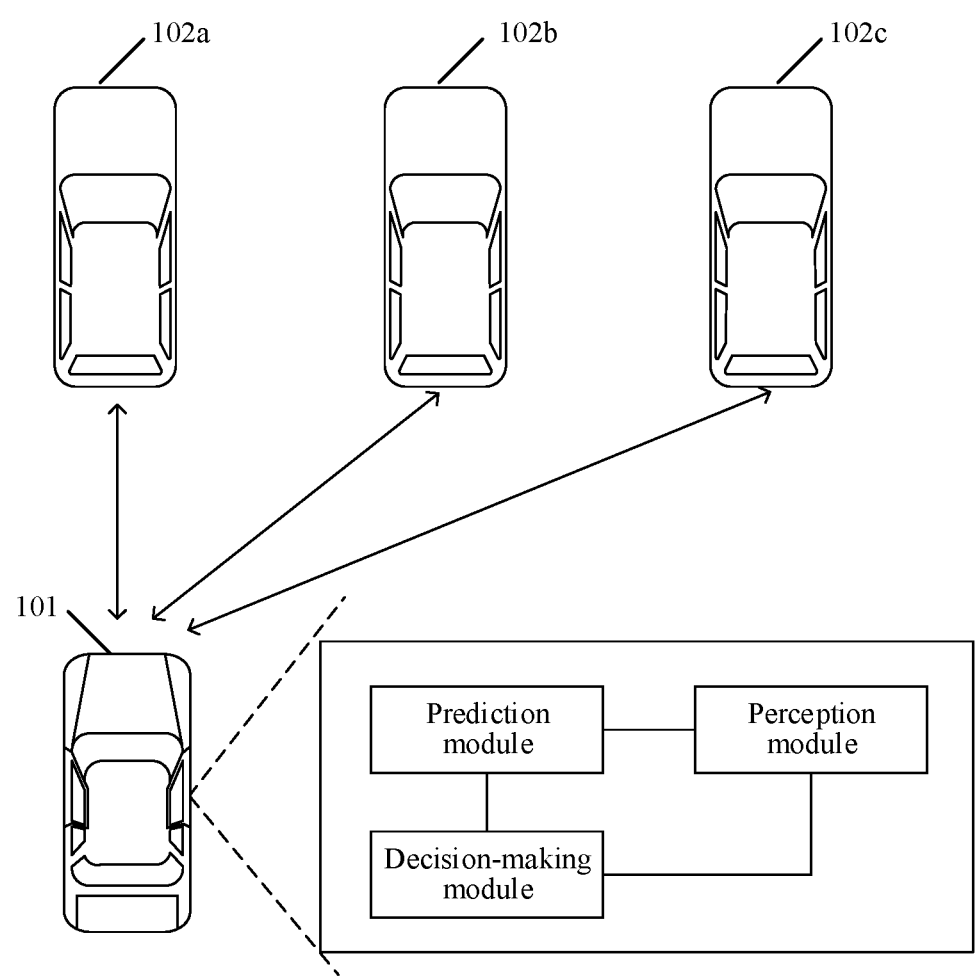

The technical solutions in the embodiments of this application are clearly and completely described in the following with reference to the accompanying drawings in the embodiments of this application. Apparently, the described embodiments are merely some rather than all of the embodiments of this application. All other embodiments obtained by persons of ordinary skill in the art based on the embodiments of this application without creative efforts shall fall within the protection scope of this application.

The embodiments of this application may be implemented by an automated driving system of a vehicle. The automated driving system may include, but not limited to, an algorithm end, a client, and a cloud. The algorithm end includes related algorithms for sensing, perception, decision-making, and the like, the client includes a robot operating system and a hardware platform, and the cloud may perform data storage, simulation, high-precision mapping, deep learning model training or prediction, and the like.

The automated driving system may be implemented by automated driving technologies. The automated driving technologies usually include high-precision maps, environment perception, behavior decision-making, path planning, motion control, and other technologies. The automated driving technologies have a wide range of application prospects.

The algorithm end is configured to extract effective information from original data acquired by a sensor, to obtain surrounding environment information of an ego vehicle, and make a decision (for example, what route to follow, at what speed, or how to avoid obstacles) based on the surrounding environment information. The sensor used in the existing automated driving system generally includes a global positioning system (GPS)/an inertial measurement unit (IMU), a light detection and ranging (LIDAR), a camera, a radar, a sonar, and the like. The algorithm end generally obtains related information about a leading car, a putative leader (PL), or a putative follower (PF) of the ego vehicle by using the sensor. The PL is a vehicle that appears or is about to appear in front of and close to the ego vehicle during traveling of the ego vehicle and may be used as a reference for traveling of the ego vehicle. In this application, a traveling state between the ego vehicle and the PF may be coordinated. The ego vehicle may obtain, by using the sensor, a vehicle existing in a lane that the ego vehicle needs to enter. For example, the ego vehicle obtains a vehicle A and a vehicle B that exist in the lane that the ego vehicle needs to enter. The ego vehicle needs to enter between the vehicle A and the vehicle B to change a lane. If the vehicle A is located in front of the vehicle B, the vehicle A is a PL of the ego vehicle, and the vehicle B is a PF of the ego vehicle. "front" is based on a traveling direction of each vehicle.

For the part of perception, effective data may be obtained from the part of sensing, and positioning, object recognition, object tracking, and the like are performed on a second vehicle according to the effective data. The part of decision-making may include behavior prediction (for example, prediction on an ambient environment and prediction on subsequent operations of a first vehicle), path planning and an obstacle avoidance mechanism on the first vehicle, and the like. The embodiment of this application includes improvement of the part of decision-making.

Specifically, FIG. 1 is a network architecture diagram of vehicle-based data processing according to an embodiment of this application. Functions implemented in this embodiment of this application may be applied to any vehicle having an automated driving system. The vehicle is recorded as a first vehicle. When the first vehicle determines to change a lane and the first vehicle obtains a PF, the first vehicle may change the lane through the functions implemented in this embodiment of this application.

As shown in FIG. 1, an automated driving system of a first vehicle (that is, an ego vehicle) 101 may include a perception module, a prediction module, a decision-making module, and the like. The perception module herein is configured to implement the functions of the part of sensing and the part of perception. The automated driving system of the first vehicle 101 may alternatively include a sensing module, a perception module, a prediction module, a decision-making module, and the like. For example, the first vehicle 101 detects another vehicle such as a vehicle 102a, a vehicle 102b, or a vehicle 102c by using the perception module. When the first vehicle 101 needs to change a lane, the first vehicle 101 obtains vehicles in a to-be-entered lane by using the perception module and determines a second vehicle (that is, the PF) from the vehicles, and decision-making is performed on the first vehicle 101, to obtain at least two predicted offsets of the first vehicle 101. Each predicted offset is equivalent to one decision of the first vehicle 101. Payoff values of the predicted offsets are obtained, and a predicted offset corresponding to a maximum payoff value may be selected as a target predicted offset, that is, an optimal decision of the first vehicle 101 is determined, to determine a traveling route of the first vehicle 101 at a next moment, and a traveling space of the second vehicle is actively occupied, to force the second vehicle to yield to the ego vehicle, so that the ego cat may own right of way to a certain extent when changing the lane, thereby improving lane change efficiency of the first vehicle.

In this embodiment of this application, an artificial intelligence technology may be used. Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that can respond in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/ interaction system, and electromechanical integration. AI software technologies mainly include several major directions such as a computer vision (CV) technology, a speech processing technology, a natural language processing technology, and machine learning/deep learning.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role. In this embodiment of this application, the AI is applied to the automated driving field.

Figure 2A:
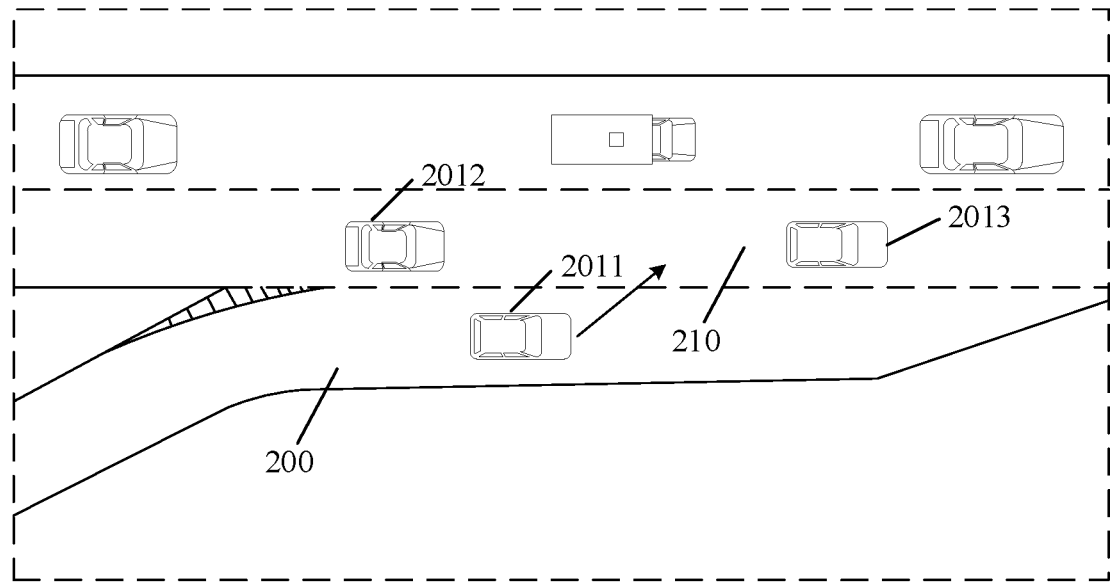
FIG. 2A to FIG. 2C are schematic diagrams of application scenarios according to an embodiment of this application.
Figure 2B:
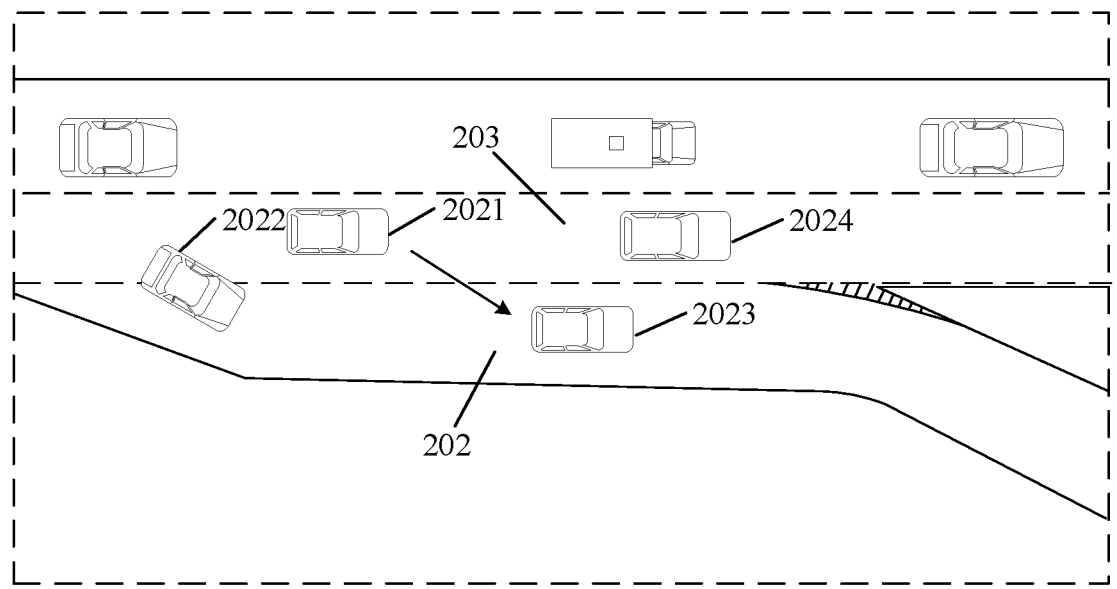
Figure 2C:
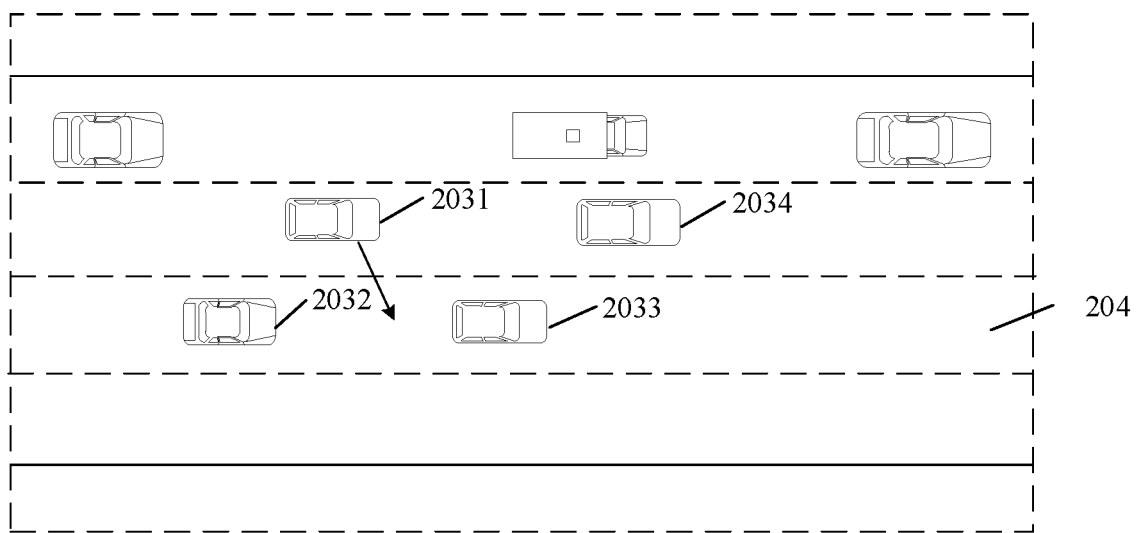

In this embodiment of this application, the AI may be applicable to any lane change scenario of an automatic driving vehicle. For example, FIG. 2A to FIG. 2C are schematic diagrams of application scenarios according to an embodiment of this application. As shown in FIG. 2A, when traveling on a ramp 200 and being to enter a lane 210 (on-ramp merge), a first vehicle (that is, an ego vehicle) 2011 determines vehicles existing in the lane 210 that the first vehicle 2011 needs to enter, specifically, determines a PL 2013, a PF 2012, and the like when the first vehicle 2011 changes the lane. The first vehicle 2011 needs to enter the lane 210 in which the PL 2013 and the PF 2012 are located. An automated driving system of the first vehicle 2011 may determine a target predicted offset based on this embodiment of this application, and occupy a traveling space of the PF 2012 based on the target predicted offset, to hold certain active right of way, thereby improving lane change efficiency of the first vehicle 2011. The ramp is an indispensable part of interchange, and is a road for up and down intersection. In a t-type (y-type) interchange, intersected main roads are usually defined as main lines, intersected secondary roads are defined as lead lines, and lines connecting the lead lines and the main lines are referred to as ramps.

As shown in FIG. 2B, when traveling to a ramp 202 (off-ramp merge), a first vehicle (that is, an ego vehicle) 2021 determines a PL 2023 and a PF 2022 of the first vehicle 2021, determines a target predicted offset by using the method implemented in this embodiment of this application, and travels based on the target predicted offset to occupy a traveling space of the PF 2022, to hold certain active right of way, thereby improving lane change efficiency of the first vehicle 2021. A vehicle that is located on a same lane 203 as the first vehicle 2021 and travels in front of the first vehicle 2021 is a leading car 2024 of the first vehicle 2021 The leading car may refer to a vehicle that is located on a same lane as an ego vehicle and travels in front of the ego vehicle. The PL may refer to a vehicle that travels in front of the ego vehicle in a lane that the ego vehicle needs to enter.

Similarly, as shown in FIG. 2C, when a first vehicle 2031 enters a lane in which a PL 2033 and a PF 2032 of the first vehicle 2031 are located, that is, enters between the PL 2033 and the PF 2032, a traveling route of the first vehicle 2031 may be planned in this embodiment of this application, to improve lane change efficiency of the first vehicle 2031. FIG. 2A to FIG. 2C are merely listed several possible application scenarios to which this application is applicable, and another lane change scenario may also be applicable to the solution implemented in this embodiment of this application. This is not limited herein.

Figure 3:
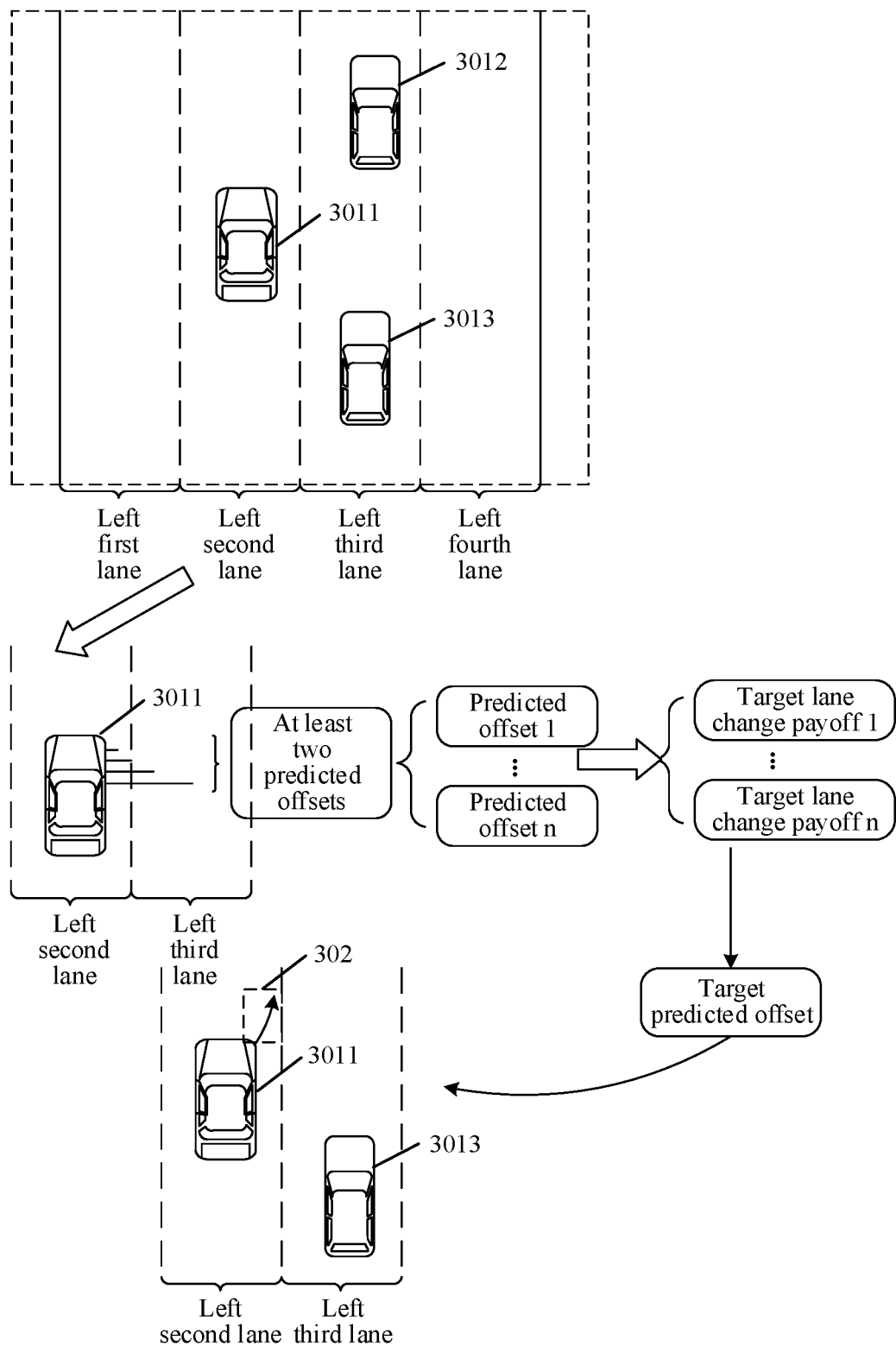
FIG. 3 is a schematic diagram of a scenario of determining a leader vehicle according to an embodiment of this application.

For example, FIG. 3 is a schematic diagram of a scenario of determining a leader vehicle according to an embodiment of this application. As shown in FIG. 3, it is assumed that a traffic road in which a first vehicle 3011 is located includes a left first lane, a left second lane, a left third lane, and a left fourth lane. A lane in which the first vehicle 3011 is located is the left second lane, and the first vehicle 3011 changes from the left second lane to the left third lane, to enter between a PL 3012 and a PF 3013. The PF 3013 is recorded as a second vehicle. An automated driving system of the first vehicle 3011 may make a decision on the first vehicle 3011, to determine at least two predicted offsets of the first vehicle 3011. The predicted offset is used for indicating a predicted distance by which the first vehicle 3011 is offset to the left third lane (a lane to be changed) at a next moment. The at least two predicted offsets include n predicted offsets such as a predicted offset 1, . . . , and a predicted offset n, n being a positive integer. The automated driving system determines a target lane change payoff of each predicted offset based on traveling states of the first vehicle 3011 and the second vehicle 3013, to obtain a target lane change payoff 1 of the predicted offset 1, . . . , and a target lane change payoff n of the predicted offset n. it is assumed that a target lane change payoff 3 in the target lane change payoff 1 to the target lane change payoff n is the largest, the automated driving system determines a predicted offset 3 corresponding to the target lane change payoff 3 as a target predicted offset, determines a predicted offset track 302 of the first vehicle 3011 based on the target predicted offset, and controls the first vehicle 3011 to travel along the predicted offset track 302, to increase a probability that the second vehicle 3013 yields to the first vehicle 3011 based on the predicted offset track 302, so that a probability that the first vehicle 3011 successfully changes to the left third lane is increased, thereby improving lane change efficiency of the first vehicle 3011.

Figure 4:
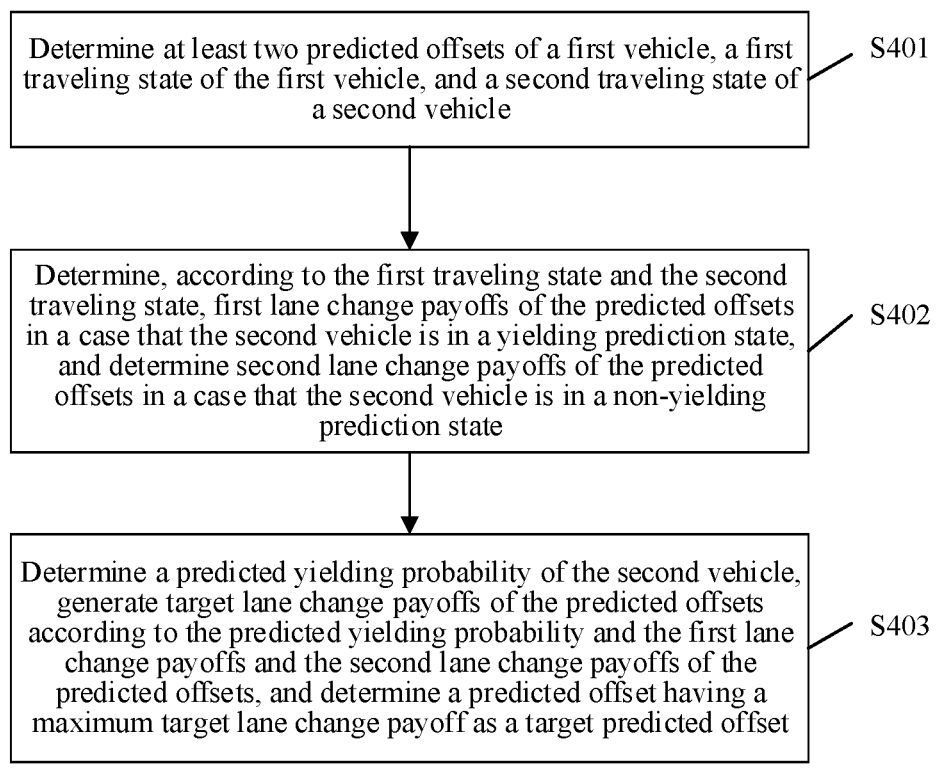
FIG. 4 is a flowchart of a vehicle-based data processing method according to an embodiment of this application.

Further, FIG. 4 is a flowchart of a vehicle-based data processing method according to an embodiment of this application. As shown in FIG. 4, the vehicle-based data processing method includes the following steps.

Step S401. Determine at least two predicted offsets of a first vehicle, a first traveling state of the first vehicle, and a second traveling state of a second vehicle.

In this embodiment of this application, when controlling an ego vehicle (that is, a first vehicle) to change a lane, an automated driving system of the first vehicle determines traffic information of a lane that the ego vehicle changes the lane to enter and determines, according to the determined traffic information, whether a PF of the first vehicle exists in the lane. The PF may be considered as a vehicle affecting lane change of the first vehicle, and the PF is recorded as a second vehicle. In other words, if the second vehicle does not yield to the first vehicle, the first vehicle cannot enter the lane in which the second vehicle is located. After detecting the second vehicle, the automated driving system of the first vehicle makes a decision on an offset of the first vehicle when traveling to the lane in which the second vehicle is located, to obtain at least two predicted offsets of the first vehicle, and determines a first traveling state of the first vehicle and a second traveling state of the second vehicle. If the automated driving system detects that the PF and a PL of the first vehicle do not exist in the lane that the ego vehicle needs to enter, the automated driving system controls the first vehicle to directly change the lane. If the automated driving system detects that the PF of the first vehicle does not exist in the lane to which the ego vehicle needs to enter but the PL of the first vehicle exists in the lane that the ego vehicle needs to enter, the automated driving system controls the first vehicle to adjust a longitudinal distance between the first vehicle and the PL and controls the first vehicle to change the lane after the adjustment.

Figure 5:
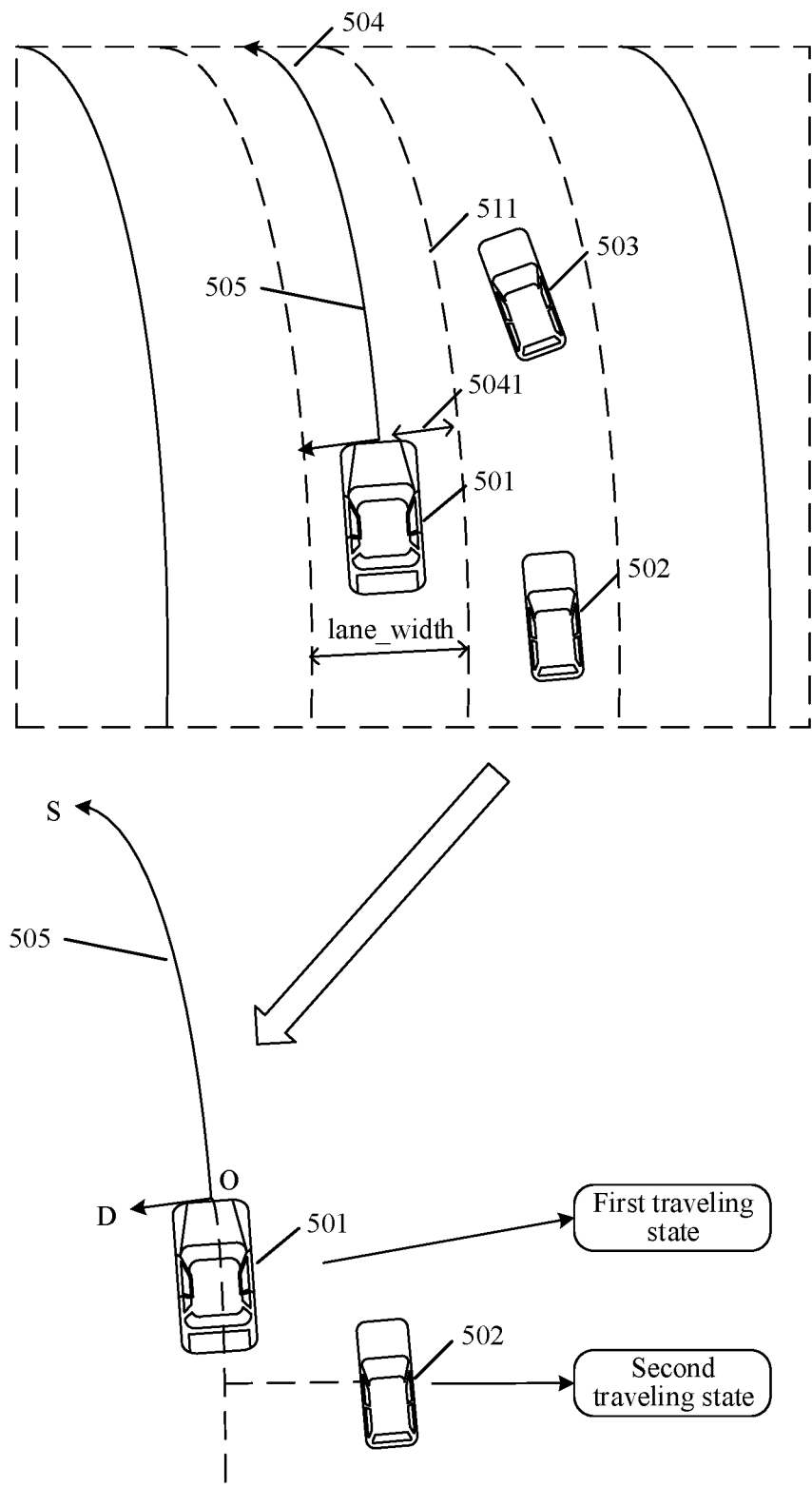
FIG. 5 is a schematic diagram of a traveling decision-making scenario according to an embodiment of this application.

The second vehicle is a reference vehicle when the first vehicle changes a lane. The automated driving system may determine a lane width of the lane and a quantity of decisions. The quantity of decisions may be predetermined. In this case, the automated driving system may obtain a preset quantity of decisions from, for example, a memory. The automated driving system may further determine a horizontal distance between the first vehicle and a lane line of a first lane in which the first vehicle is located, and determine the at least two predicted offsets of the first vehicle based on the lane width, the horizontal distance, and the quantity of decisions. A quantity of the at least two predicted offsets may be equal to the quantity of decisions. For example, FIG. 5 is a schematic diagram of a traveling decision-making scenario according to an embodiment of this application. As shown in FIG. 5, an automated driving system of a first vehicle 501 determines a PL and a PF. The PF is recorded as a second vehicle 502, the PL is recorded as a third vehicle 503, and a lane width is denoted as lane width. It is assumed that the quantity of decisions is n. The automated driving system determines a horizontal distance 5041 between the first vehicle 501 and a lane line 511 of a first lane 504 in which the first vehicle 501 is located. The lane line 511 is a common side line of the first lane 504 and a second lane in which the second vehicle 502 is located. The automated driving system may determine n predicted offsets offset based on the lane width lane_width and the horizontal distance 5041. For example, a minimum predicted offset of the n predicted offsets may be 0, and a maximum predicted offset may be the lane width lane width. The automated driving system may determine the n predicted offsets between 0 and the lane width lane width. For example, the lane width lane_width is 3.5 m, n is 5, and the horizontal distance 5041 between the first vehicle 501 and the lane line of the first lane 504 is 0.9 m. Therefore, the at least two predicted offsets determined by the automated driving system may include "a predicted offset offset=0, a predicted offset offset=0.3 m, a predicted offset offset=0.6 m, a predicted offset offset=0.9 m, a predicted offset offset=3.5 m, and the like". The at least two predicted offsets may be classified as an original lane offset and a changed lane offset. The original lane offset is a predicted offset less than or equal to the horizontal distance 5041, and the changed lane offset is a predicted offset greater than the horizontal distance 5041 and less than or equal to the lane width lane_width. The automated driving system may determine, based on the quantity of decisions, a quantity n1 of predicted offsets included in the original lane offset and a quantity n2 of predicted offsets included in the changed lane offset, determine n1 predicted offsets based on the horizontal distance 5041 and the quantity n1 of predicted offsets included in the original lane offset, and determine n2 predicted offsets based on the horizontal distance 5041, the lane width lane_width, and the quantity n2 of predicted offsets included in the changed lane offset, both n1 and n2 being positive integers, and a sum of n1 and n2 being n.

Further, the automated driving system may determine the first lane in which the first vehicle is located, and establish a road coordinate system by using a center line of the first lane as a coordinate longitudinal axis, a point on the coordinate longitudinal axis to which the first vehicle is mapped as a coordinate origin, and a normal line corresponding to the coordinate longitudinal axis as a coordinate horizontal axis. When the first vehicle is mapped to the coordinate longitudinal axis, a shortest distance between the first vehicle and the coordinate longitudinal axis may be determined, and a point corresponding to the short distance on the coordinate longitudinal axis is used as the coordinate origin. Alternatively, the first vehicle may be mapped to the coordinate longitudinal axis, a mapping route from the first vehicle to the coordinate longitudinal axis is perpendicular to the coordinate longitudinal axis, and a point on the coordinate longitudinal axis to which the first vehicle is mapped is determined as the coordinate origin.

The first traveling state of the first vehicle may include, but not limited to, first position information, a first traveling speed, a first traveling direction, and the like of the first vehicle. The second traveling state of the first vehicle may include, but not limited to, second position information, a second traveling speed, a second traveling direction, and the like of the second vehicle. The first traveling state of the first vehicle and the second traveling state of the second vehicle may be determined by a perception module in the automated driving system. Specifically, the automated driving system may determine the first position information of the first vehicle in the road coordinate system, and determine the first traveling state of the first vehicle according to the first position information; and determine the second position information of the second vehicle in the road coordinate system, and determine the second traveling state of the second vehicle according to the second position information. The first traveling speed, the first traveling direction, the second traveling speed, and the second traveling direction may alternatively be determined based on the road coordinate system.

For example, referring to FIG. 5, the automated driving system determines a coordinate origin O, a coordinate longitudinal axis S, and a coordinate horizontal axis D. The coordinate origin O, the coordinate longitudinal axis S, and the coordinate horizontal axis D form a road coordinate system 505. A direction of the coordinate longitudinal axis S may be a traveling direction of the first vehicle 501. For example, in FIG. 5, first position information of the first vehicle 501 is (x1, y1). For example, the first vehicle 501 is at the coordinate origin O, thus, x1 is 0, and y1 is 0. A first traveling speed may be directly determined by obtaining a speed (for example, a speed displayed on a dashboard), and the like of the first vehicle 501. A first traveling direction may be represented by using a first unit vector. For example, when the first unit vector is (0, 1), it indicates that the first traveling direction is a traveling direction along the coordinate longitudinal axis S. A first traveling state of the first vehicle 501 includes the first position information, the first traveling speed, the first traveling direction, and the like. Second position information of the second vehicle 502 is (x2, y2), and a second traveling direction may be represented by using a second unit vector. The second position information, the second direction, and a second traveling speed are determined based on the road coordinate system 505. A second traveling state of the second vehicle 502 includes the second position information, the second traveling direction, the second traveling speed, and the like.

Step S402. Determine, according to the first traveling state and the second traveling state, first lane change payoffs of the predicted offsets when the second vehicle is in a yielding prediction state, and determine second lane change payoffs of the predicted offsets when the second vehicle is in a non-yielding prediction state.

In this embodiment of this application, first lane change payoffs of the predicted offsets and second lane change payoffs of the predicted offsets that are determined by the automated driving system of the first vehicle may be represented in Table 1.

TABLE 1

| Ego vehicle (EV) | PF | |
| --- | --- | --- |
| | Yield (yielding prediction state) | Not Yield (non-yielding prediction state) |
| Predicted offset 1: offset = 0 | $a_{1,2}$ | $a_{1,2}$ |
| Predicted offset 2: offset = 0.3 | $a_{2,2}$ | $a_{2,2}$ |
| Predicted offset 3: offset = 0.6 | $a_{3,1}$ | $a_{3,2}$ |
| Predicted offset 4: offset = 0.9 | $a_{4,1}$ | $a_{4,2}$ |
| Predicted offset 5: offset = 3.5 | $a_{5,1}$ | $a_{5,2}$ |

As shown in Table 1, Table 1 includes at least two predicted offsets of the EV (that is, the first vehicle) and two prediction states of the second vehicle (that is, the PF). For example, the at least two predicted offsets include n predicted offsets. It is assumed that n is 5. The at least two predicted offsets may be denoted as $\Phi_{EV} \triangleq \{\varphi_i^{EV}; i \leq n\}$, and $\varphi_i^{EV}$ represents an $i^{th}$ predicted offset. The two prediction states of the second vehicle may be denoted as $\Phi_{PF} \triangleq \{\varphi_j^{PF}; j \leq 2\}$, and $\varphi_j^{PF}$ represents a $j^{th}$ prediction state of the second vehicle. The at least two predicted offsets include "predicted offset 1: offset=0, predicted offset 2: offset=0.3 m, predicted offset 3: offset=0.6 m, predicted offset 4: offset=0.9 m, and predicted offset 5: offset=3.5 m". The two prediction states of the second vehicle include a yielding prediction state (Yield) and a non-yielding prediction state (Not Yield). $a_{i,j}$ may represent a $j^{th}$ lane change payoff of the $i^{th}$ predicted offset when the second vehicle is in the $j^{th}$ prediction state, both i and j being positive integers, i being less than or equal to n, n being a quantity of predicted offsets included in the at least two predicted offsets, and j being less than or equal to 2. For example, $a_{1,1}$ is used for representing a first lane change payoff of a first predicted offset (that is, the predicted offset 1) when the second vehicle is in the yielding prediction state. $a_{i,j} = f(S^{EV}, S^{PF}, \varphi_i^{EV}, \varphi_j^{PF})$, where $S^{EV}$ is used for representing the first traveling state of the first vehicle, and $S^{PF}$ is used for representing the second traveling state of the second vehicle. The first traveling state and the second traveling state are, for example, a first traveling state and a second traveling state at a current moment.

In an example, the automated driving system may obtain a yielding probability model. The yielding probability model may be predetermined. The first traveling state, the second traveling state, and the $i^{th}$ predicted offset are inputted into the yielding probability model, to obtain a probability of the yielding prediction state and a probability of the non-yielding prediction state that correspond to the $i^{th}$ predicted offset, i being a positive integer, and i being less than or equal to a quantity of the at least two predicted offsets. The probability of the yielding prediction state is determined as a first lane change payoff of the $i^{th}$ predicted offset when the second vehicle is in the yielding prediction state. The probability of the non-yielding prediction state is determined as a second lane change payoff of the $i^{th}$ predicted offset when the second vehicle is in the non-yielding prediction state.

Step S403. Determine a predicted yielding probability of the second vehicle, generate target lane change payoffs of the predicted offsets according to the predicted yielding probability and the first lane change payoffs and the second lane change payoffs of the predicted offsets, and determine a predicted offset having a maximum target lane change payoff as a target predicted offset.

In this embodiment of this application, the automated driving system may obtain historical longitudinal times to collision and historical distances to collision corresponding to the historical longitudinal times to collision, and determine a time to collision average value and a time to collision standard deviation according to the historical longitudinal times to collision and the historical distances to collision. The historical longitudinal times to collision and the historical distances to collision corresponding to the historical longitudinal times to collision may be longitudinal time to collision samples and distance to collision samples corresponding to the longitudinal time to collision samples of one or more vehicles acquired during a test in advance. For example, a distribution rule of longitudinal times to collision when a vehicle A turns on a turn light and is ready to change a lane for a plurality of times, and a vehicle in the side rear of the vehicle A yields to the vehicle A and corresponding longitudinal distances to collision are counted. The historical distances to collision may be obtained by respectively performing test and data collection on different distance to collision intervals. The time to collision average value is denoted as $\mu_{ttc}$, and the time to collision standard deviation is denoted as $\sigma_{ttc}$. The historical distance to collision may be used for dividing the historical longitudinal time to collision. For example, a statistical distance range is obtained, historical distances to collision falling within the statistical distance range are obtained, and a time to collision average value and a time to collision standard deviation are determined according to historical longitudinal times to collision corresponding to the historical distances to collision falling within the statistical distance range. If a distance to collision between a vehicle 1 and a vehicle 2 falls within the statistical distance range, it indicates that the vehicle 1 and the vehicle 2 may affect lane change performed by a vehicle that needs to change a lane to enter between the two vehicles (that is, the vehicle 1 and the vehicle 2). The time to collision (TTC) is also referred to as an estimated time to collision and means a time from a current moment to occurrence of collision if two vehicles keep a current speed and a traveling track unchanged and do not adopt any collision avoidance action. For example, TTC=a distance between the two vehicles/a relative speed between the two vehicle. The time to collision sometimes refers to a longitudinal time to collision. A distance to collision or an estimated distance to collision corresponds to the time to collision.

For whether the second vehicle (PF) yields to the first vehicle (EV), two factors may be considered: longitudinal collision risk and lateral distance safety. For the longitudinal factor, because the second vehicle holds right of way, when the first vehicle wants to change a lane, if the second vehicle does not have enough time to yield, the second vehicle often chooses not to yield and will maintain an original state or even accelerate. The probability relationship may be described by using a Gaussian variable. The automated driving system may determine a longitudinal time to collision between the second vehicle and the first vehicle, and map the longitudinal time to collision to a first probability density function generated by the time to collision average value and the time to collision standard deviation, to determine an initial yielding probability of the second vehicle. The initial yielding probability may be represented by using a formula a $$p(\text{Yield}; ttc(EV, PF)) \propto \exp\left(\frac{ttc(EV, PF) - \mu_{ttc}}{\sigma_{ttc}}\right) \quad 1$$

where p(Yield; ttc(EV, PF)) represents an initial yielding probability of the second vehicle at a given longitudinal time to collision between the first vehicle and the second vehicle, ttc(EV, PF) is used for representing a longitudinal time to collision between the first vehicle and the second vehicle, $\propto$ represents directly proportional to, and $$\exp\left(\frac{ttc(EV, PF) - \mu_{ttc}}{\sigma_{ttc}}\right)$$

is the first probability density function.

Further, for the lateral factor, a rear vehicle generally yields to a vehicle in the side front due to too small lateral distance but does not yield when the lateral distance is relatively large. The automated driving system may obtain historical traffic lateral distances, and determine a distance average value and a distance standard deviation according to the historical traffic lateral distances, the difference average value being denoted as $\mu_{dy}$, and the distance standard deviation being denoted as $\sigma_{dy}$. Similar to the historical longitudinal times to collision and the historical distances to collision, the historical traffic lateral distances are acquired or obtained historical traffic lateral distance samples of one or more vehicles in advance. The automated driving system may further obtain a traffic lateral distance between the second vehicle and the first vehicle, and map the traffic lateral distance to a second probability density function generated by the distance average value and the distance standard deviation, to determine a traveling keeping probability of the second vehicle. The traveling keeping probability may be used for representing a probability that the second vehicle does not yield to the first vehicle (that is, a probability that the second vehicle is in a second prediction state). The traveling keeping probability may be represented by using a formula ②:

$$p(\text{Not Yield}; dy(EV, PF)) \propto \exp\left(\frac{dy(EV, PF) - \mu_{dy}}{\sigma_{dy}}\right) \quad 2$$

where $\sigma_{dy}$ represents a traveling keeping probability of the second vehicle at a given traffic lateral distance between the first vehicle and the second vehicle, dy(EV, PF) is used for representing a traffic lateral distance between the first vehicle and the second vehicle, $\propto$ represents directly proportional to, and $$\exp\left(\frac{dy(EV, PF) - \mu_{dy}}{\sigma_{dy}}\right)$$

is the second probability density function.

In an example, when the standard deviations (for example, the time to collision standard deviation or the distance standard deviation) mentioned in this embodiment of this application are obtained, variances (for example, a time to collision variance corresponding to the time to collision standard deviation or a distance variance corresponding to the distance standard deviation) respectively corresponding to the standard deviations may alternatively be obtained. The standard deviation is an arithmetic square root of the corresponding variance. Regardless of whether the variance is obtained or the standard deviation is obtained, the implementation of this embodiment of this application is not affected or the implementation of the formula ① and the formula ② is not affected. Details are not described herein again.

The automated driving system may determine a predicted yielding probability of the second vehicle according to the initial yielding probability and the traveling keeping probability. The predicted yielding probability may be represented by using a formula ③:

$$P(\text{Yield})=P(\text{Yield};ttc(EV,PF))*(1-P(\text{Not Yield};dy(EV,PF))) \quad ③$$

The formula ③ is a formula of generating the predicted yielding probability when the initial yielding probability and the traveling keeping probability are independent events. If the initial yielding probability and the traveling keeping probability are non-independent events, the formula of generating the predicted yielding probability according to the initial yielding probability and the traveling keeping probability may be determined based on a relationship between the initial yielding probability and the traveling keeping probability.

After generating target lane change payoffs of the predicted offsets according to the predicted yielding probability, and the first lane change payoffs and the second lane change payoffs of the predicted offsets, the automated driving system may determine a predicted offset having a maximum target lane change payoff as a target predicted offset. The target predicted offset is used for representing a lateral lane change traveling distance predicted for the first vehicle.

Further, in step S402, a specific process of determining the first lane change payoffs and the second lane change payoffs of the first vehicle is as follows.

Each lane change payoff in Table 1 may be determined by using a plurality of payoff parameters. It is assumed that there are m payoff parameters, each lane change payoff may be determined by using any one or any h payoff parameters in the m payoff parameters, m being a positive integer, and h being a positive integer less than or equal to m. For example, m is 3, that is, there are three payoff parameters. Therefore, each lane change payoff may be determined by using one payoff parameter, or may be determined by using any two payoff parameters, or may be determined by using three payoff parameters, which is not limited herein. $a_p^{i,j}$ may be used for representing a $j^{th}$ lane change payoff of an $i^{th}$ predicted offset determined according to a $p^{th}$ payoff parameter when the second vehicle is in a $j^{th}$ prediction state, p being a positive integer and p being less than or equal to m.

In a lane change payoff determining manner, the automated driving system may determine an offset distance of the first vehicle according to the first position information, the offset distance being a distance between the first vehicle and a center line of the first lane in which the first vehicle is located; and obtain an $i^{th}$ predicted offset, determine, according to a difference between the $i^{th}$ predicted offset and the offset distance, a first lane change payoff of the $i^{th}$ predicted offset when the second vehicle is in the yielding prediction state, and determine a second lane change payoff of the $i^{th}$ predicted offset when the second vehicle is in the non-yielding prediction state, i being a positive integer, and i being less than or equal to a quantity of the at least two predicted offsets. A payoff parameter determined according to the difference between the $i^{th}$ predicted offset and the offset distance may be recorded as a first payoff parameter of the $i^{th}$ predicted offset when the second vehicle is in different prediction states, and the first payoff parameter of the $i^{th}$ predicted offset is determined as the first lane change payoff and the second lane change payoff of the $i^{th}$ predicted offset. For example, the first payoff parameter is used for representing ego vehicle comfortableness, and the ego vehicle comfortableness may be represented by using a formula (4):

$$a_1^{i,j} = -|\varphi_i^{EV} - \varphi^{EV}(S^{EV})| \quad (4)$$

where $a_1^{i,j}$ represents the first payoff parameter and may represent comfortableness of the first vehicle under the $i^{th}$ predicted offset when the second vehicle is in the $j^{th}$ prediction state, and $\varphi^{EV}(S^{EV})$ is a distance between the first vehicle and the center line of the first lane in which the first vehicle is located. It is assumed that $\varphi^{EV}(S^{EV}) = 0$, by taking Table 1 as an example, $a_1^{1,j} = 0$, $a_1^{2,j} = -|0.3| = -0.3$, $a_1^{3,j} = -0.6$, $a_1^{4,j} = -0.9$, and $a_1^{5,j} = -3.5$. If the first lane change payoff and the second lane change payoff are directly determined according to the first payoff parameter, $a_{i,j} = a_1^{i,j}$ may be recorded.

In the lane change payoff determining manner, the automated driving system may obtain a first longitudinal coordinate value in the first position information and a second longitudinal coordinate value in the second position information, and determine a longitudinal time to collision between the first vehicle and the second vehicle according to the first longitudinal coordinate value, the first traveling speed, the second longitudinal coordinate value, and the second traveling speed. In addition, the automated driving system may obtain a first horizontal coordinate value in the first position information and a second horizontal coordinate value in the second position information, obtain an $i^{th}$ predicted offset, and determine a traffic lateral distance corresponding to the $i^{th}$ predicted offset according to the first horizontal coordinate value, the second horizontal coordinate value, and the $i^{th}$ predicted offset, i being a positive integer, and i being less than or equal to a quantity of the at least two predicted offsets. In addition, the automated driving system may further determine, according to the longitudinal time to collision and the traffic lateral distance corresponding to the $i^{th}$ predicted offset, the first lane change payoff of the $i^{th}$ predicted offset when the second vehicle is in the yielding prediction state, and determine the second lane change payoff of the $i^{th}$ predicted offset when the second vehicle is in the non-yielding prediction state. The automated driving system may further determine a plurality of payoff parameters such as a second payoff parameter "lateral safety", a third payoff parameter "collision safety", a fourth payoff parameter "lane change reward", and the like according to the longitudinal time to collision and the traffic lateral distance corresponding to the $i^{th}$ predicted offset, and may further directly determine the first lane change payoff and the second lane change payoff according one of the payoff parameters, or may randomly combine the payoff parameters and determine the first lane change payoff and the second lane change payoff according to any group of payoff parameters.

For example, the second payoff parameter is used for representing the lateral safety, and the lateral safety may be represented by using a formula (5):

$$a_2^{i,j} = \begin{cases} -1.0, & \text{if } ttc(EV, PF) < 2.0 \text{ and } dy(EV, PL; \varphi_i^{EV}) < 1.0 \\ 0, & \text{otherwise.} \end{cases} \quad 5$$

where $a_2^{i,j}$ represents the second payoff parameter and may represent the lateral safety of the first vehicle under the $i^{th}$ predicted offset when the second vehicle is in the $j^{th}$ prediction state, ttc(EV, PF) is used for representing the longitudinal time to collision between the first vehicle and the second vehicle, and dy(EV,PL; $\varphi_i^{EV}$) represents a traffic lateral distance corresponding to the $i^{th}$ predicted offset when the $i^{th}$ predicted offset $\varphi_i^{EV}$ is given. The formula (5) may represent that the second payoff parameter of the $i^{th}$ predicted offset is determined as −1 when the longitudinal time to collision is less than 2 s and the traffic lateral distance of the $i^{th}$ predicted offset is less than 1 m. In another case (that is, otherwise), the second payoff parameter of the $i^{th}$ predicted offset may be determined as 0. If the first lane change payoff and the second lane change payoff are directly determined according to the second payoff parameter, $a_{i,j} = a_2^{i,j}$ may be recorded.

In the formula (5), a first time threshold compared with the longitudinal time to collision and a first distance threshold compared with the traffic lateral distance may be modified as required. For example, the first time threshold "2 s" and the first distance threshold "1 m" in the formula (5) are empirical values or may be another value. This is not limited herein. When the longitudinal time to collision is less than the first time threshold and the traffic lateral distance of the $i^{th}$ predicted offset is less than the first distance threshold, the determined second payoff parameter of the $i^{th}$ predicted offset may also be modified as required.

ttc(EV,PF) may be represented by using a formula (6):

$$ttc(EV,PF) = (l_{EV} - l_{PF})/(v_{PF} - v_{EV}), v_{PF} > v_{EV} \quad (6)$$

where $l_{EV}$ represents a first longitudinal coordinate value of the first vehicle in a road coordinate system, $l_{PF}$ represents a second longitudinal coordinate value of the second vehicle in the road coordinate system, $v_{PF}$ represents a second traveling speed of the second vehicle, and $v_{EV}$ represents a first traveling speed of the first vehicle.

For example, the third payoff parameter is used for representing the collision safety, and the collision safety may be represented by using a formula (7):

$$a_3^{i,j} = \begin{cases} -10.0, & \text{if } ttc(EV, PF) < 2.0 \text{ and } dy(EV, PF; \varphi_i^{EV}) < 0 \\ 0, & \text{otherwise.} \end{cases} \quad 7$$

where $a_3^{i,j}$ is used for representing the third payoff parameter and may represent the collision safety of the first vehicle under the $i^{th}$ predicted offset when the second vehicle is in the $j^{th}$ prediction state, and meanings of ttc(EV,PF) and dy(EV,PL;$\varphi_i^{EV}$) may refer to the related description in the formula ⑤. The formula ⑦ may represent that the third payoff parameter of the $i^{th}$ predicted offset is determined as −10 when the longitudinal time to collision is less than 2 s and the traffic lateral distance of the $i^{th}$ predicted offset is less than 0 m. In another case, the third payoff parameter of the $i^{th}$ predicted offset may be determined as 0. If the first lane change payoff and the second lane change payoff are directly determined according to the third payoff parameter, $a_{i,j}=a_3^{i,j}$ may be recorded.

In the formula ⑦, a second time threshold compared with the longitudinal time to collision and a second distance threshold compared with the traffic lateral distance may be modified as required. For example, the second time threshold "2 s" and the second distance threshold "0 m" in the formula ⑦ are empirical values or may be another value. This is not limited herein. When the longitudinal time to collision is less than the second time threshold and the traffic lateral distance of the $i^{th}$ predicted offset is less than the second distance threshold, the determined third payoff parameter of the $i^{th}$ predicted offset may also be modified as required.

For example, the fourth payoff parameter is used for representing the lane change reward, and the lane change reward may be represented by using a formula ⑧:

$$a_4^{i,j} = \begin{cases} 5.0, & \text{if } ttc(EV, PF) > 3.0 \text{ and } dy(EV, PF; \varphi_i^{EV}) < 0 \\ 0, & \text{otherwise} \end{cases} \quad 8$$

where $a_4^{i,j}$ is used for representing the fourth payoff parameter and may represent the lane change reward of the first vehicle under the $i^{th}$ predicted offset when the second vehicle is in the $j^{th}$ prediction state, and meanings of ttc(EV,PF) and dy(EV,PL;$\varphi_i^{EV}$) may refer to the related description in the formula ⑤. The formula ⑧ may represent that the fourth payoff parameter of the $i^{th}$ predicted offset is determined as 5 when the longitudinal time to collision is greater than 3 s and the traffic lateral distance of the $i^{th}$ predicted offset is less than 0 m. In another case, the fourth payoff parameter of the $i^{th}$ predicted offset may be determined as 0. If the first lane change payoff and the second lane change payoff are directly determined according to the fourth payoff parameter, $a_{i,j}=a_4^{i,j}$ may be recorded.

In the formula ⑧, a third time threshold compared with the longitudinal time to collision and a third distance threshold compared with the traffic lateral distance may be modified as required. For example, the third time threshold "3 s" and the first distance threshold "0 m" in the formula ⑧ are empirical values or may be another value. This is not limited herein. When the longitudinal time to collision is greater than the third time threshold and the traffic lateral distance of the $i^{th}$ predicted offset is less than the third distance threshold, the determined fourth payoff parameter of the $i^{th}$ predicted offset may also be modified as required.

In another lane change payoff obtaining manner, the automated driving system may determine third position information of a third vehicle, and determine a lead longitudinal distance between the second vehicle and the third vehicle according to the second position information and the third position information. The second vehicle and the third vehicle are in a same lane, and the third vehicle and the second vehicle are in a same traveling direction. The third vehicle is in front of the second vehicle, and the front is based on the traveling direction of the second vehicle. The third vehicle may be considered as a putative leader PL of the first vehicle. The automated driving system may further obtain a third traveling speed of the third vehicle. The automated driving system may determine an $i^{th}$ yielding distance of the second vehicle according to the $i^{th}$ predicted offset and the lead longitudinal distance, determine, based on the second traveling speed, the third traveling speed, and the $i^{th}$ yielding distance, the first lane change payoff of the $i^{th}$ predicted offset when the second vehicle is in the yielding prediction state, and determine the second lane change payoff of the $i^{th}$ predicted offset when the second vehicle is in the non-yielding prediction state, i being a positive integer, and i being less than or equal to a quantity of the at least two predicted offsets. The $i^{th}$ yielding distance is a distance between the second vehicle and the third vehicle increased based on the lead longitudinal distance under the $i^{th}$ predicted offset when the second vehicle is in the yielding prediction state.

Figure 6:
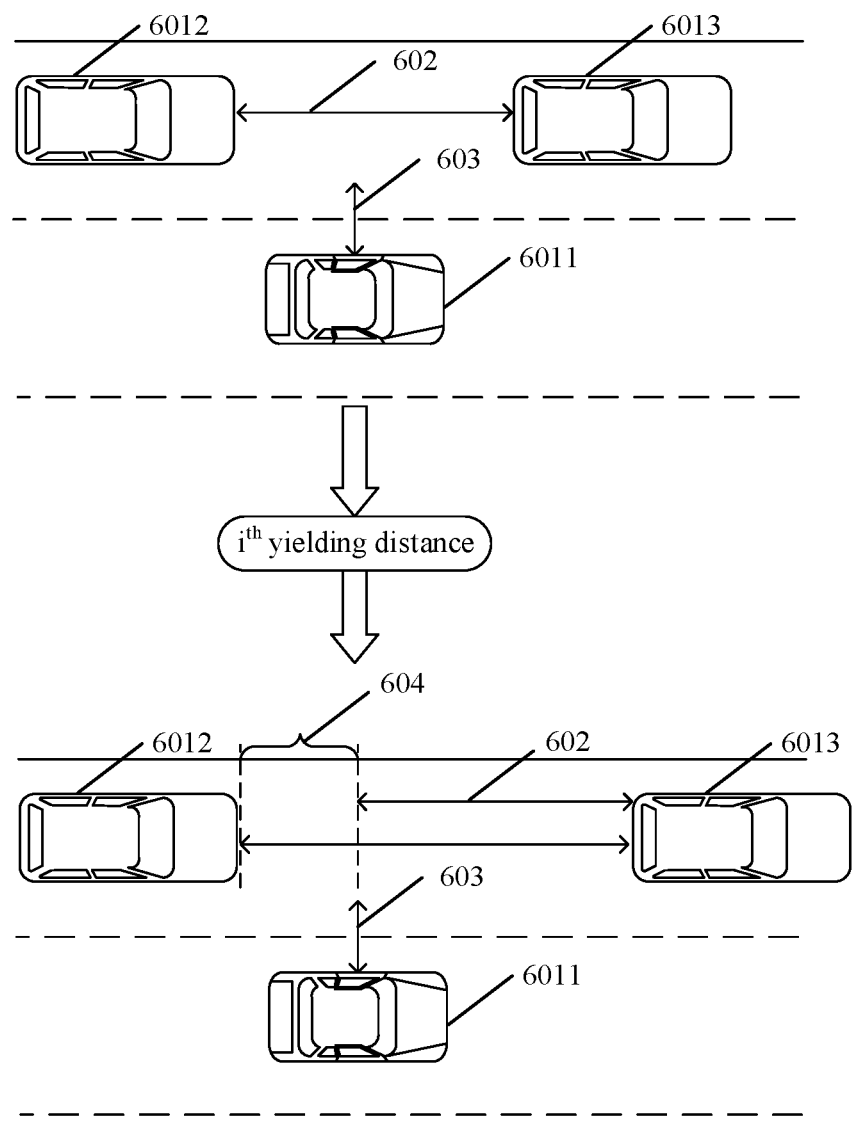
FIG. 6 is a schematic diagram of a yielding distance determining scenario according to an embodiment of this application.

FIG. 6 is a schematic diagram of a yielding distance determining scenario according to an embodiment of this application. As shown in FIG. 6, an automated driving system of a first vehicle 6011 obtains a second longitudinal coordinate value of a second vehicle 6012, third position information of a third vehicle 6013, and a third longitudinal coordinate value in the third position information, and determines a lead longitudinal distance 602 between the second vehicle 6012 and the third vehicle 6013 according to the second longitudinal coordinate value and the third longitudinal coordinate value. The automated driving system obtains an $i^{th}$ predicted offset 603 and determines an $i^{th}$ yielding distance of the second vehicle based on the $i^{th}$ predicted offset 603 and the lead longitudinal distance 602. The $i^{th}$ yielding distance is a distance 604 between the second vehicle 6012 and the third vehicle 6013 increased based on the lead longitudinal distance 602 under the $i^{th}$ predicted offset 603 when the second vehicle 6012 is in a yielding prediction state.

In addition, the automated driving system may determine a fifth payoff parameter based on the second traveling speed, the third traveling speed, and the $i^{th}$ yielding distance, the fifth payoff parameter being used for representing a traffic block cost. The traffic block cost may be represented by using a formula ⑨:

$$a_5^{i,j} = \begin{cases} -5.0, & \text{if } acc(PF; S^{EV}, \varphi_i^{EV}, \varphi_j^{PF}) < -1.0 \\ 0, & \text{otherwise} \end{cases} \quad 9$$

where acc(PF;$S^{EV}$,$\varphi_i^{EV}$,$\varphi_j^{PF}$) is used for representing a deceleration required by the second vehicle if the second vehicle yields to the first vehicle (that is, if the second vehicle is in the yielding prediction state) when a first traveling state $S^{EV}$ of the first vehicle, the $i^{th}$ predicted offset $\varphi_i^{EV}$, and the $j^{th}$ prediction state are given. In an implementation, the first traveling state, the second traveling state, the $i^{th}$ predicted offset, and the $j^{th}$ prediction state may alternatively be inputted into an intelligent driver model (IDM), and the deceleration of the second vehicle is determined based on the IDM. The formula ⑨ may represent that the fifth payoff parameter of the $i^{th}$ predicted offset is determined as −5 when the deceleration of the second vehicle is less than −1. In another case (that is, otherwise), the fifth payoff parameter of the $i^{th}$ predicted offset may be determined as 0. If the first lane change payoff and the second lane change payoff are directly determined according to the fifth payoff parameter, $a_{i,j}=a_5{}^{i,j}$ may be recorded.

The first payoff parameter to the fifth payoff parameter are exemplary payoff parameters (in this case, m is 5), and another payoff parameter may alternatively be increased as required. This is not limited herein. The first lane change payoff and the second lane change payoff may be determined based on any one or any h payoff parameters in the m payoff parameters. If the first lane change payoff and the second lane change payoff are determined based on the h payoff parameters, weighted summation may be performed on the h payoff parameters under the $i^{th}$ predicted offset and the $j^{th}$ prediction state, to obtain a $j^{th}$ lane change payoff under the $i^{th}$ predicted offset and the $j^{th}$ prediction state. For example, if the first lane change payoff and the second lane change payoff are determined according to them payoff parameters, the first lane change payoff and the second lane change payoff may be represented by using a formula ⑩:

$$a_{i,j}=\Sigma_{p=1}{}^{m}\lambda_p a_p{}^{i,j} \qquad ⑩$$

where $\lambda_p$ may be determined according to degrees of importance of the payoff parameters. For example, the degrees of importance of the payoff parameters are the same, so that regardless of the value of p, $\lambda_p$ is 1.

In this embodiment of this application, at least two predicted offsets of a first vehicle, a first traveling state of the first vehicle, and a second traveling state of a second vehicle are determined. First lane change payoffs of the predicted offsets are determined according to the first traveling state and the second traveling state when the second vehicle is in a yielding prediction state, and second lane change payoffs of the predicted offsets are determined when the second vehicle is in a non-yielding prediction state. A predicted yielding probability of the second vehicle is determined, target lane change payoffs of the predicted offsets are generated according to the predicted yielding probability and the first lane change payoffs and the second lane change payoffs of the predicted offsets, and a predicted offset having a maximum target lane change payoff is determined as a target predicted offset, the target predicted offset being used for representing a lateral lane change traveling distance predicted for the first vehicle. Through the above process, decision-making is performed on the first vehicle (that is, an ego vehicle), the decision being used for representing a possible offset distance (that is, the at least two predicted offsets) of the first vehicle, payoff values of the decisions are obtained, to obtain a decision making the first vehicle generate a maximum payoff, and the first vehicle may be controlled based on the decision (the target predicted offset) to travel, so that the first vehicle may have right of way to a certain extent and may actively change a lane based on the decision, to improve lane change efficiency of the first vehicle.

Figure 7:
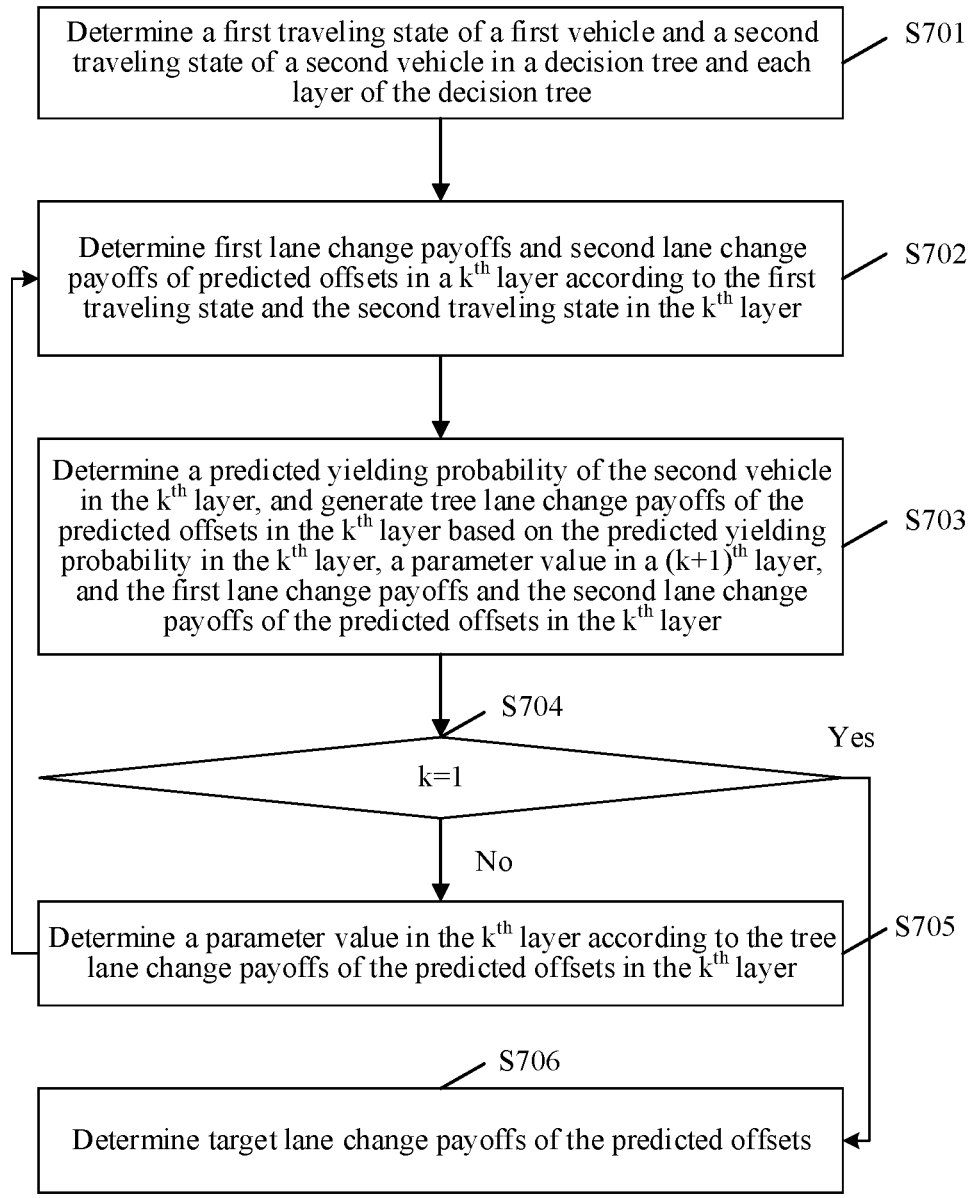
FIG. 7 is a specific flowchart of a vehicle-based data processing method according to an embodiment of this application.

Further, FIG. 7 is a specific flowchart of a vehicle-based data processing method according to an embodiment of this application. In the method, the automated driving system may construct a decision tree. Decision boundaries in the decision tree include at least two predicted offsets, a yielding prediction state, and a non-yielding prediction state. Tree nodes in the decision tree include a first vehicle and a second vehicle. Weighted summation is performed on first lane change payoffs and second lane change payoffs of predicted offsets layer by layer according to a predicted yielding probability and the decision boundaries in at least two decision layers of the decision tree until tree payoff values of the predicted offsets in a root node of the decision tree are obtained. The tree payoff values of the predicted offsets in a root node are determined as target lane change payoffs of the predicted offsets.

As shown in FIG. 7, the data processing method may include the following steps.

Step S701. Determine a first traveling state of a first vehicle and a second traveling state of a second vehicle in a decision tree and each layer of the decision tree.

In this embodiment of this application, the automated driving system may determine a decision tree. It is assumed that the decision tree includes T decision layers, and each decision layer includes a structure in which the first vehicle and the second vehicle alternately serve as tree nodes. That is, a parent node of the first vehicle may be the second vehicle, and a parent node of the second vehicle may be the first vehicle. Each decision layer includes decision boundaries formed by at least two predicted offsets of the first vehicle, and a yielding prediction state and a non-yielding prediction state of the second vehicle. T is a positive integer, and T is a quantity of decision layers included in the decision tree. For example, the first vehicle corresponds to n decision boundaries, and each decision boundary corresponds to one predicted offset of the first vehicle. The second vehicle corresponds to two decision boundaries, which respectively correspond to the yielding prediction state and the non-yielding prediction state. The automated driving system may obtain a first traveling state of the first vehicle and a second traveling state of the second vehicle in each layer in the decision tree. The first traveling state includes a first actual traveling state and (T−1) first predicted traveling states, each first traveling state corresponding to a decision layer. The second traveling state includes a second actual traveling state and (T−1) second predicted traveling states, each second traveling state corresponding to a decision layer. For example, the automated driving system may obtain a first actual traveling state and a second actual traveling state, predict the first actual traveling state, to obtain a first predicted traveling state in a second decision layer, and predict the second actual traveling state, to obtain a second predicted traveling state in the second decision layer; predict the first predicted traveling state in the second decision layer, to obtain a first predicted traveling state in a third decision layer, and predict the second predicted traveling state in the second decision layer, to obtain a second prediction traveling state in the third decision layer; . . . ; and predict the first predicted traveling state in the $(T-1)^{th}$ decision layer, to obtain a first predicted traveling state in a $T^{th}$ decision layer, and predict the second predicted traveling state in the $(T-1)^{th}$ decision layer, to obtain a second predicted traveling state in the $T^{th}$ decision layer.

Step S702. Determine first lane change payoffs and second lane change payoffs of predicted offsets in a $k^{th}$ layer according to the first traveling state and the second traveling state in the $k^{th}$ layer.

In this embodiment of this application, the automated driving system may determine first lane change payoffs and second lane change payoffs of predicted offsets in a $k^{th}$ layer according to the first predicted traveling state and the second predicted traveling state in the $k^{th}$ layer, k being a positive integer, and k being less than or equal to T. For a process in which the automated driving system determines the first lane change payoffs and the second lane change payoffs of the predicted offsets in the $k^{th}$ layer according to the first predicted traveling state and the second predicted traveling state in the $k^{th}$ layer, reference may be made to the detailed description shown in step S402 in FIG. 4. Details are not described herein again.

Step S703. Determine a predicted yielding probability of the second vehicle in the $k^{th}$ layer, and generate tree lane change payoffs of the predicted offsets in the $k^{th}$ layer based on the predicted yielding probability in the $k^{th}$ layer, a parameter value in a $(k+1)^{th}$ layer, and the first lane change payoffs and the second lane change payoffs of the predicted offsets in the $k^{th}$ layer.

In this embodiment of this application, the automated driving system may determine a predicted yielding probability of the second vehicle in the $k^{th}$ layer. For a process of determining the predicted yielding probability of the second vehicle in the $k^{th}$ layer, reference may be made to the detailed description shown in step S403 in FIG. 4. For example, ttc(EV, PF) in the formula ① represents a longitudinal time to collision between the first vehicle and the second vehicle determined according to the first predicted traveling state and the second predicted traveling state in the $k^{th}$ layer. The predicted yielding probability of the second vehicle in the $k^{th}$ layer may be determined according to the first predicted traveling state and the second predicted traveling state in the $k^{th}$ layer The tree payoff values of the predicted offsets in the $k^{th}$ layer may refer to a formula (1):

$$Q(S_k^{EV}, S_k^{PF}, \varphi_i^{EV}) = P(\text{Yield})(a_{i,1} + V(S_{k+1}^{EV}, S_{k+1}^{PF}; S_k^{EV}, S_k^{PF}, \varphi_i^{EV}, \varphi_0^{PF})) + (1 - P(\text{Yield})(a_{i,2} + V(S_{k+1}^{EV}, S_{k+1}^{PF}; S_k^{EV}, S_k^{PF}, \varphi_i^{EV}, \varphi_1^{PF}))) \quad (1)$$

where $S_k^{EV}$ is used for representing a traveling state of the first vehicle in the $k^{th}$ layer, $S_{k+1}^{EV}$ represents a traveling state of the first vehicle in a $(k+1)^{th}$ layer, and $S_{k+1}^{EV}$ is obtained by predicting $S_k^{EV}$; and $S_k^{PF}$ represents a traveling state of the second vehicle in the $k^{th}$ layer, $S_{k+1}^{PF}$ represents a traveling state of the second vehicle in the $(k+1)^{th}$ layer, and $S_{k+1}^{PF}$ is obtained by predicting $S_k^{PF}$. (Yield) represents the predicted yielding probability of the second vehicle in the $k^{th}$ layer, $a_{i,1}$ represents a first lane change payoff of the $i^{th}$ predicted offset when the second vehicle is in the yielding prediction state, and $a_{i,2}$ is a second lane change payoff of the $i^{th}$ predicted offset when the second vehicle is in the non-yielding prediction state. $Q(S_k^{EV}, S_k^{PF}, \varphi_i^{EV})$ is used for representing a tree payoff value of the $i^{th}$ predicted offset in the $k^{th}$ layer.

Step S704. Detect that k=1.

In this embodiment of this application, the automated driving system determines whether k is 1, performs step S706 if k is 1, and performs step S705 if k is not 1.

Step S705. Determine a parameter value in the $k^{th}$ layer according to the tree lane change payoffs of the predicted offsets in the $k^{th}$ layer.

In this embodiment of this application, the automated driving system may determine a parameter value in the $k^{th}$ layer according to the tree lane change payoffs of the predicted offsets in the $k^{th}$ layer. A manner of determining the parameter value in the $k^{th}$ layer may refer to a formula (2):

$$V(S_k^{EV}, S_k^{PF}) = \begin{cases} \max_{i \leq 5} Q(S_k^{EV}, S_k^{PF}, \varphi_i^{EV}), & k \leq T, \\ 0, & k = T+1 \end{cases} \quad (2)$$

where when k=T+1, the parameter value is set to a preset parameter value, for example, in the formula (2), the preset parameter value is 0. When k≤T, the parameter value in the $k^{th}$ layer is a maximum tree lane change payoff in the tree lane change payoffs of the predicted offsets in the $k^{th}$ layer.

Step S706. Determine target lane change payoffs of the predicted offsets.

In this embodiment of this application, the automated driving system may determine the tree payoff values of the predicted offsets in a root node as target lane change payoffs of the predicted offsets, and determine a predicted offset having a maximum target lane change payoffs as a target predicted offset. A manner of determining the target predicted offset may refer to a formula (3):

$$\varphi_{EV}^* = \text{argmax}_{\varphi_i^{EV} \in \Phi_{EV}} Q(S_{k=1}^{EV}, S_{k=1}^{PF}, \varphi_i^{EV}) \quad (3)$$

where argmax(f(x)) is a variable point x (or a set of x) making f(x) obtain a maximum value. In an implementation, if more than one predicted offset having the maximum target lane change payoff is determined according to the formula (3), the predicted offset having the maximum target lane change payoff and a maximum value may be determined as the target predicted offset.

The automated driving system may determine a predicted offset track according to the target predicted offset and a second lane in which the second vehicle is located, a lateral traveling distance corresponding to the predicted offset track in the lane being the target predicted offset; and control the first vehicle to travel along the predicted offset track.

Figure 8:
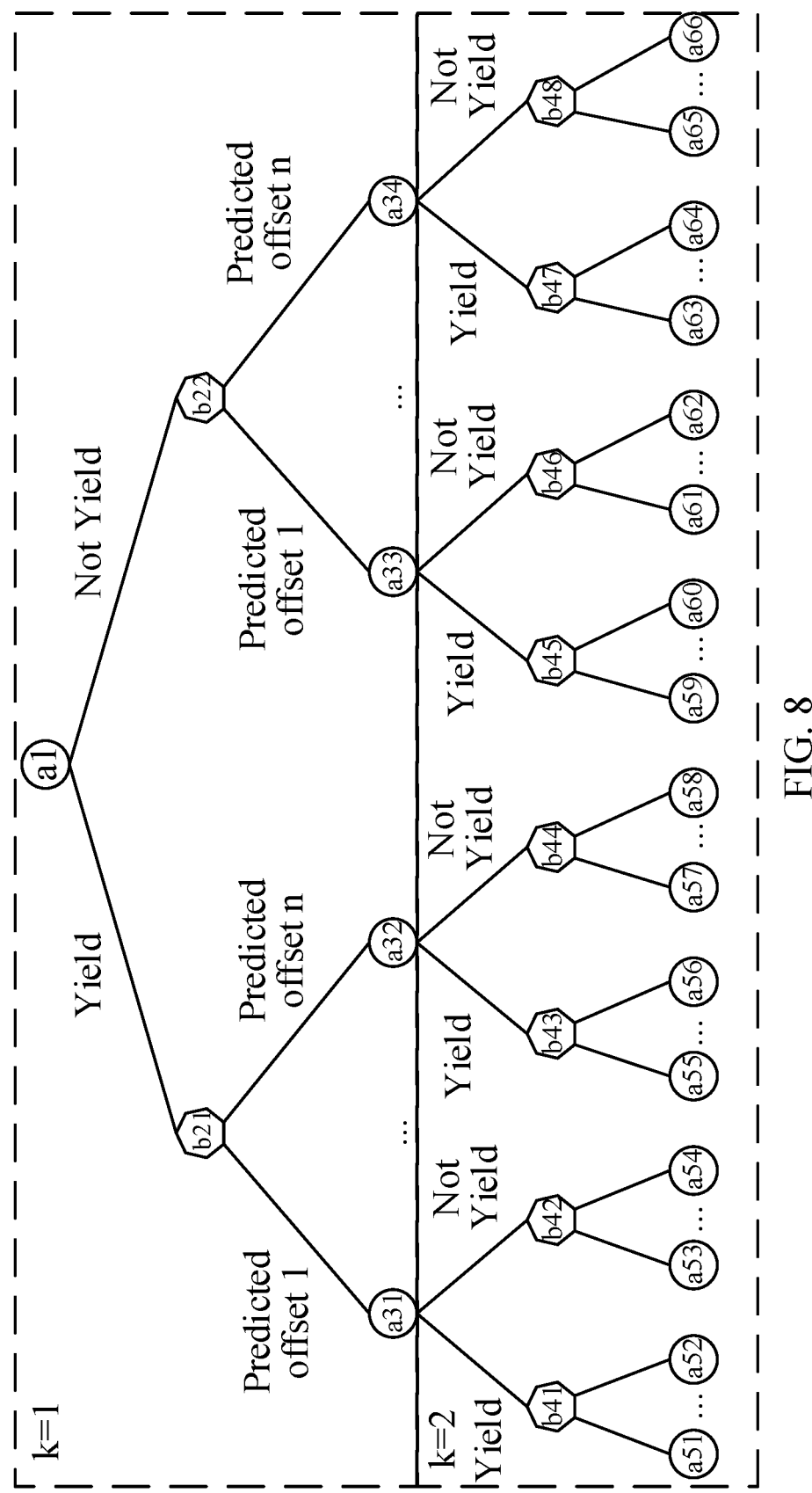
FIG. 8 is a schematic diagram of a tree structure of a decision tree according to an embodiment of this application.

For example, if a decision tree includes two decision layers, that is, at least two decision layers in the decision tree include a decision layer k1 and a decision layer k2, the decision layer k1 including a root node. The first traveling state includes a first actual traveling state and a first predicted traveling state, and the second traveling state includes a second actual traveling state and a second predicted traveling state. The first lane change payoffs include first lane change payoffs in the decision layer k1 and first lane change payoffs in the decision layer k2, and the second lane change payoffs include second lane change payoffs in the decision layer k1 and second lane change payoffs in the decision layer k2. For example, FIG. 8 is a schematic diagram of a tree structure of a decision tree according to an embodiment of this application. As shown in FIG. 8, a circle in the decision tree represents a second vehicle, a heptagon represents a first vehicle, and the decision tree includes a decision layer k1 (that is, k=1) and a decision layer k2 (that is, k=2). A root node of the decision tree is a second vehicle a1. The root node a1 includes two decision boundaries, which respectively represent a yielding prediction state and a non-yielding prediction state (Not Yield). The two decision boundaries are respectively connected to a first vehicle b21 and a first vehicle b22. The first vehicle b21 corresponds to n decision boundaries, which respectively represent a predicted offset 1, . . . , and a predicted offset n, and the n decision boundaries corresponding to the first vehicle b21 are respectively connected to a second vehicle a31, . . . , and a second vehicle a32. The first vehicle b22 corresponds to n decision boundaries, which respectively represent a predicted offset 1, . . . , and a predicted offset n, and the n decision boundaries corresponding to the first vehicle b22 are respectively connected to a second vehicle a33, . . . , and a second vehicle a34; and . . . until leaf nodes of the decision tree are obtained, for example, a second vehicle a51, a second vehicle a52, . . . , and a second vehicle a66. For details, reference is made to numerals of tree nodes in FIG. 8, and the decision tree is generated. If T is greater than 2, a decision layer is continuously generated based on the two decision layers in FIG. 8, to obtain T decision layers, so as to generate a decision tree.

Specifically, the automated driving system may determine, according to the first actual traveling state and the second actual traveling state, the first lane change payoffs of the predicted offsets in the decision layer k1 when the second vehicle is in the yielding prediction state, and determine the second lane change payoffs of the predicted offsets in the decision layer k1 when the second vehicle is in the non-yielding prediction state; predict the first predicted traveling state of the first vehicle according to the first actual traveling state, and predict the second predicted traveling state of the second vehicle according to the second actual traveling state; and determine, according to the first predicted traveling state and the second predicted traveling state, the first lane change payoffs of the predicted offsets in the decision layer k2 when the second vehicle is in the yielding prediction state, and determine the second lane change payoffs of the predicted offsets in the decision layer k2 when the second vehicle is in the non-yielding prediction state.

The automated driving system may obtain a predicted yielding probability of the second vehicle in the decision layer k1 and a predicted yielding probability in the decision layer k2; perform weighted summation on the first lane change payoffs and the second lane change payoffs of the predicted offsets in the decision layer k2 according to the predicted yielding probability in the decision layer k2, to obtain tree payoff values of the predicted offsets in the decision layer k2; determine a maximum tree payoff value in the tree payoff values of the predicted offsets in the decision layer k2 as a parameter value of the decision layer k2; and perform weighted summation on the parameter value of the decision layer k2 and the first lane change payoffs and the second lane change payoffs of the predicted offsets in the decision layer k1 according to the predicted yielding probability in the decision layer k1, to obtain tree payoff values of the predicted offsets in the decision layer k1, the tree payoff values of the predicted offsets in the decision layer k1 being tree payoff values of the predicted offsets in the root node of the decision tree. In the root node, a predicted offset having a maximum tree payoff value is determined as a target predicted offset, a predicted offset track of the first vehicle is determined based on the target predicted offset, and the first vehicle is controlled to travel along the predicted offset track, to actively occupy a traveling space of the second vehicle, so that the first vehicle may implement a lane change operation to the second lane when the first vehicle is offset to the second lane in which the second vehicle is located as much as possible and the traffic accident between the first vehicle and the second vehicle is minimal, to improve lane change efficiency of the first vehicle.

In this embodiment of this application, through the above process, the first vehicle may be offset to the second lane in which the second vehicle is located to occupy the traveling space of the second vehicle rather than waiting for the second vehicle to actively yield and then changing a lane, so as to more accurately express an intention of changing the lane to the second vehicle, thereby improving the lane change efficiency of the first vehicle.

Figure 9:
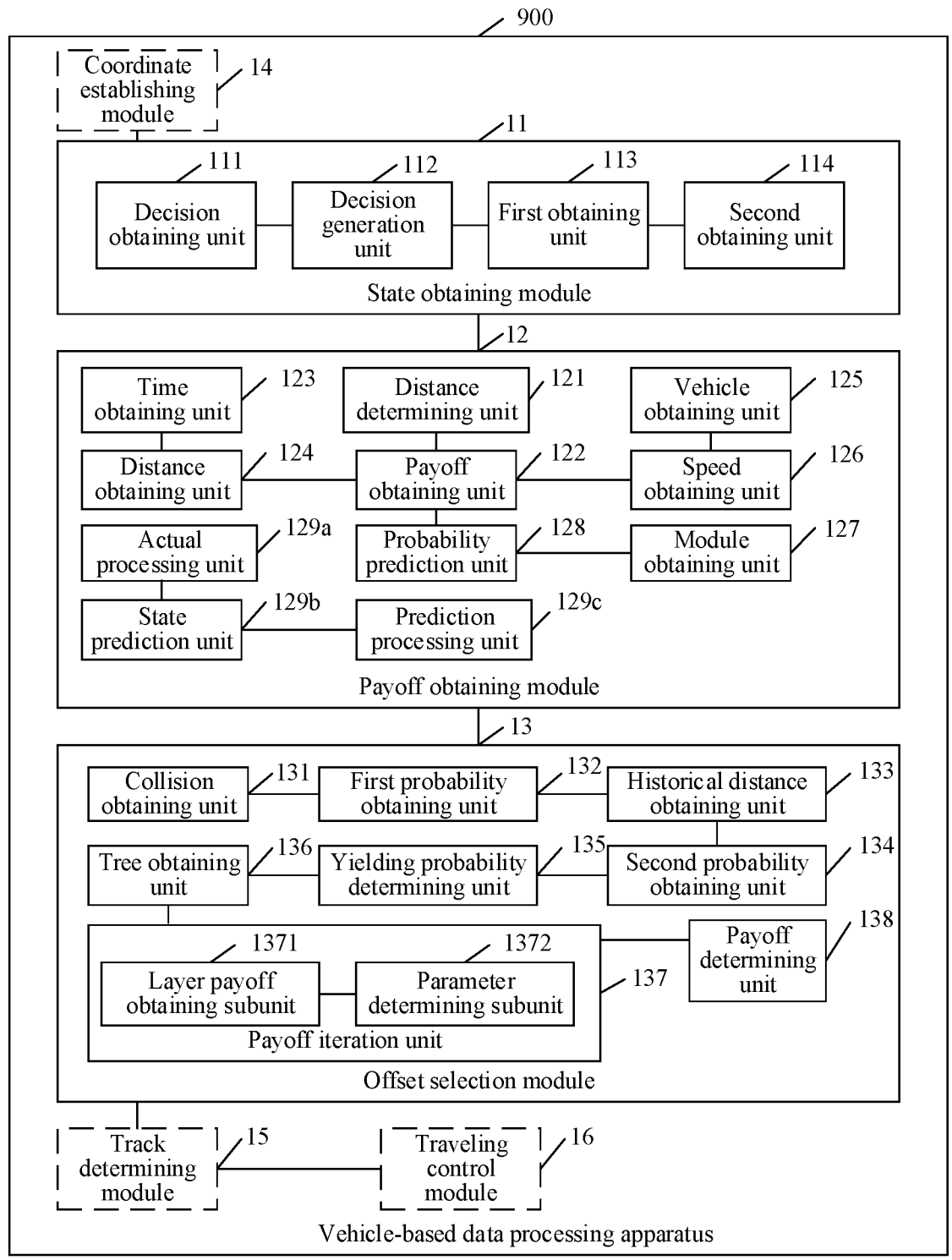
FIG. 9 is a schematic diagram of a vehicle-based data processing apparatus according to an embodiment of this application.

Further, FIG. 9 is a schematic diagram of a vehicle-based data processing apparatus 900 according to an embodiment of this application. The vehicle-based data processing apparatus may be a computer program (including program code) run in a computer device. For example, the vehicle-based data processing apparatus is application software. The apparatus may be configured to perform the corresponding steps in the method provided in the embodiments of this application. As shown in FIG. 9, the vehicle-based data processing apparatus 900 is applicable to the computer device in the foregoing embodiment corresponding to FIG. 4. Specifically, the apparatus may include: a state obtaining module 11, a payoff obtaining module 12, and an offset selection module 13.

The state obtaining module 11 is configured to determine at least two predicted offsets of a first vehicle, a first traveling state of the first vehicle, and a second traveling state of a second vehicle, the second vehicle being a reference vehicle when the first vehicle changes a lane.

The payoff obtaining module 12 is configured to determine, according to the first traveling state and the second traveling state, first lane change payoffs of the predicted offsets when the second vehicle is in a yielding prediction state, and determine second lane change payoffs of the predicted offsets when the second vehicle is in a non-yielding prediction state.

The offset selection module 13 is configured to determine a predicted yielding probability of the second vehicle, generate target lane change payoffs of the predicted offsets according to the predicted yielding probability and the first lane change payoffs and the second lane change payoffs of the predicted offsets, and determine a predicted offset having a maximum target lane change payoff as a target predicted offset, the target predicted offset being used for representing a lateral lane change traveling distance predicted for the first vehicle.

In the aspect of determining at least two predicted offsets of a first vehicle, the state obtaining module 11 includes:
  a decision obtaining unit 111, configured to determine a lane width of the lane and a quantity of decisions; and
  a decision generation unit 112, configured to determine a horizontal distance between the first vehicle and a lane line of a first lane in which the first vehicle is located, and determine the at least two predicted offsets of the first vehicle based on the lane width, the horizontal distance, and the quantity of decisions, a quantity of the at least two predicted offsets being the quantity of decisions.

The apparatus 900 further includes:
  a coordinate establishing module 14, configured to determine the first lane in which the first vehicle is located, and establish a road coordinate system by using a center line of the first lane as a coordinate longitudinal axis, a point on the coordinate longitudinal axis to which the first vehicle is mapped as a coordinate origin, and a normal line corresponding to the coordinate longitudinal axis as a coordinate horizontal axis.

In the aspect of determining a first traveling state of the first vehicle and a second traveling state of a second vehicle, the state obtaining module 11 includes:
  a first obtaining unit 113, configured to determine first position information of the first vehicle in the road coordinate system, and determine the first traveling state of the first vehicle according to the first position information; and
  a second obtaining unit 114, configured to determine second position information of the second vehicle in the road coordinate system, and determine the second traveling state of the second vehicle according to the second position information,
  the first traveling state including the first position information and the second traveling state including the second position information.

The payoff obtaining module 12 includes:
  a distance determining unit 121, configured to determine an offset distance of the first vehicle according to the first position information, the offset distance being a distance between the first vehicle and a center line of the first lane in which the first vehicle is located; and
  a payoff obtaining unit 122, configured to obtain an ith predicted offset, determine, according to a difference between the ith predicted offset and the offset distance, a first lane change payoff of the ith predicted offset when the second vehicle is in the yielding prediction state, and determine a second lane change payoff of the ith predicted offset when the second vehicle is in the non-yielding prediction state, i being a positive integer, and i being less than or equal to a quantity of the at least two predicted offsets.

The first traveling state includes the first position information and a first traveling speed and the second traveling state includes the second position information and a second traveling speed.

The payoff obtaining module 12 includes:
  a time obtaining unit 123, configured to obtain a first longitudinal coordinate value in the first position information and a second longitudinal coordinate value in the second position information, and determine a longitudinal time to collision between the first vehicle and the second vehicle according to the first longitudinal coordinate value, the first traveling speed, the second longitudinal coordinate value, and the second traveling speed; and
  a distance obtaining unit 124, configured to obtain a first horizontal coordinate value in the first position information and a second horizontal coordinate value in the second position information, obtain an $i^{th}$ predicted offset, and determine a traffic lateral distance corresponding to the $i^{th}$ predicted offset according to the first horizontal coordinate value, the second horizontal coordinate value, and the $i^{th}$ predicted offset, i being a positive integer, and i being less than or equal to a quantity of the at least two predicted offsets.

The payoff obtaining unit 122 is further configured to determine, according to the longitudinal time to collision and the traffic lateral distance corresponding to the $i^{th}$ predicted offset, the first lane change payoff of the $i^{th}$ predicted offset when the second vehicle is in the yielding prediction state, and determine the second lane change payoff of the $i^{th}$ predicted offset when the second vehicle is in the non-yielding prediction state.

The first traveling state includes the first position information and the first traveling speed and the second traveling state includes the second position information and the second traveling speed.

The payoff obtaining module 12 includes:
  a vehicle obtaining unit 125, configured to determine third position information of a third vehicle, and determine a lead longitudinal distance between the second vehicle and the third vehicle according to the second position information and the third position information, the second vehicle and the third vehicle being in a same lane, and the third vehicle and the second vehicle being in a same traveling direction; and
  a speed obtaining unit 126, configured to determine a third traveling speed of the third vehicle.

The payoff obtaining unit 122 is further configured to determine an $i^{th}$ yielding distance of the second vehicle according to the $i^{th}$ predicted offset and the lead longitudinal distance, determine, based on the second traveling speed, the third traveling speed, and the $i^{th}$ yielding distance, the first lane change payoff of the $i^{th}$ predicted offset when the second vehicle is in the yielding prediction state, and determine the second lane change payoff of the $i^{th}$ predicted offset when the second vehicle is in the non-yielding prediction state, i being a positive integer, and i being less than or equal to a quantity of the at least two predicted offsets. The $i^{th}$ yielding distance is a distance between the second vehicle and the third vehicle increased based on the lead longitudinal distance under the $i^{th}$ predicted offset when the second vehicle is in the yielding prediction state.

The payoff obtaining module 12 includes:
  a module obtaining unit 127, configured to obtain a yielding probability model; and
  a probability prediction unit 128, configured to input the first traveling state, the second traveling state, and an $i^{th}$ predicted offset into the yielding probability model, to obtain a probability of the yielding prediction state and a probability of the non-yielding prediction state that correspond to the $i^{th}$ predicted offset, i being a positive integer, and i being less than or equal to a quantity of the at least two predicted offsets.

The payoff obtaining unit 122 is further configured to determine the probability of the yielding prediction state as the first lane change payoff of the $i^{th}$ predicted offset when the second vehicle is in the yielding prediction state.

The payoff obtaining unit 122 is further configured to determine the probability of the non-yielding prediction state as the second lane change payoff of the $i^{th}$ predicted offset when the second vehicle is in the non-yielding prediction state.

In the aspect of determining a predicted yielding probability of the second vehicle, the offset selection module 13 includes:
  a collision obtaining unit 131, configured to obtain historical longitudinal times to collision and historical distances to collision corresponding to the historical longitudinal times to collision, and determine a time to collision average value and a time to collision standard deviation according to the historical longitudinal times to collision and the historical distances to collision;
  a first probability obtaining unit 132, configured to determine a longitudinal time to collision between the second vehicle and the first vehicle, and map the longitudinal time to collision to a first probability density function generated by the time to collision average value and the time to collision standard deviation, to determine an initial yielding probability of the second vehicle;
  a historical distance obtaining unit 133, configured to obtain historical traffic lateral distances, and determine a distance average value and a distance standard deviation according to the historical traffic lateral distances;
  a second probability obtaining unit 134, configured to determine a traffic lateral distance between the second vehicle and the first vehicle, and map the traffic lateral distance to a second probability density function generated by the distance average value and the distance standard deviation, to determine a traveling keeping probability of the second vehicle according to the second probability density function; and
  a yielding probability determining unit 135, configured to determine the predicted yielding probability of the second vehicle according to the initial yielding probability and the traveling keeping probability.

In the aspect of generating target lane change payoffs of the predicted offsets according to the predicted yielding probability and the first lane change payoffs and the second lane change payoffs of the predicted offsets, the offset selection module 13 includes:
- a tree obtaining unit 136, configured to construct a decision tree, decision boundaries in the decision tree including at least two predicted offsets, a yielding prediction state, and a non-yielding prediction state, and tree nodes in the decision tree including the first vehicle and the second vehicle;
- a payoff iteration unit 137, configured to perform weighted summation on the first lane change payoffs and the second lane change payoffs of the predicted offsets layer by layer in at least two decision layers of the decision tree according to the predicted yielding probability and the decision boundaries until tree payoff values of the predicted offsets in a root node of the decision tree are obtained;
- a payoff determining unit 138, configured to determine the tree payoff values of the predicted offsets in the root node as target lane change payoffs of the predicted offsets.

The at least two decision layers in the decision tree include a decision layer k1 and a decision layer k2, the decision layer k1 including the root node. The first traveling state includes a first actual traveling state and a first predicted traveling state, and the second traveling state includes a second actual traveling state and a second predicted traveling state. The first lane change payoffs include first lane change payoffs in the decision layer k1 and first lane change payoffs in the decision layer k2, and the second lane change payoffs include second lane change payoffs in the decision layer k1 and second lane change payoffs in the decision layer k2.

The payoff obtaining module 12 includes:
- an actual processing unit 129a, configured to determine, according to the first actual traveling state and the second actual traveling state, the first lane change payoffs of the predicted offsets in the decision layer k1 when the second vehicle is in the yielding prediction state, and determine the second lane change payoffs of the predicted offsets in the decision layer k1 when the second vehicle is in the non-yielding prediction state;
- a state prediction unit 129b, configured to predict the first predicted traveling state of the first vehicle according to the first actual traveling state, and predict the second predicted traveling state of the second vehicle according to the second actual traveling state; and
- a prediction processing unit 129c, configured to determine, according to the first predicted traveling state and the second predicted traveling state, the first lane change payoffs of the predicted offsets in the decision layer k2 when the second vehicle is in the yielding prediction state, and determine the second lane change payoffs of the predicted offsets in the decision layer k2 when the second vehicle is in the non-yielding prediction state.

The predicted yielding probability includes a predicted yielding probability in the decision layer k1 and a predicted yielding probability in the decision layer k2.

The payoff iteration unit 137 includes:
- a layer payoff obtaining subunit 1371, configured to perform weighted summation on the first lane change payoffs and the second lane change payoffs of the predicted offsets in the decision layer k2 according to the predicted yielding probability in the decision layer k2, to obtain tree payoff values of the predicted offsets in the decision layer k2;
- a parameter determining subunit 1372, configured to determine a maximum tree payoff value in the tree payoff values of the predicted offsets in the decision layer k2 as a parameter value of the decision layer k2; and
- the layer payoff obtaining subunit 1371 being further configured to perform weighted summation on the parameter value of the decision layer k2 and the first lane change payoffs and the second lane change payoffs of the predicted offsets in the decision layer k1 according to the predicted yielding probability in the decision layer k1, to obtain tree payoff values of the predicted offsets in the decision layer k1, the tree payoff values of the predicted offsets in the decision layer k1 being tree payoff values of the predicted offsets in the root node of the decision tree.

The apparatus 900 further includes:
- a track determining module 15, configured to determine a predicted offset track according to the target predicted offset, a lateral traveling distance corresponding to the predicted offset track in the lane being the target predicted offset; and
- a traveling control module 16, configured to control the first vehicle to travel along the predicted offset track.

This embodiment of this application provides a vehicle-based data processing apparatus, the apparatus obtains at least two predicted offsets of a first vehicle, and obtains a first traveling state of the first vehicle, and a second traveling state of a second vehicle, the second vehicle being a reference vehicle when the first vehicle changes a lane; determines, according to the first traveling state and the second traveling state, first lane change payoffs of the predicted offsets when the second vehicle is in a yielding prediction state, and determines second lane change payoffs of the predicted offsets when the second vehicle is in a non-yielding prediction state; and obtains a predicted yielding probability of the second vehicle, generates target lane change payoffs of the predicted offsets according to the predicted yielding probability and the first lane change payoffs and the second lane change payoffs of the predicted offsets, and determines a predicted offset having a maximum target lane change payoff as a target predicted offset, the target predicted offset being used for representing a lateral lane change traveling distance predicted for the first vehicle. Through the above process, decision-making is performed on the first vehicle (that is, an ego vehicle), the decision being used for representing a possible offset distance (that is, the at least two predicted offsets) of the first vehicle, payoff values of the decisions are obtained, to obtain a decision making the first vehicle generate a maximum payoff, and the first vehicle may be controlled based on the decision (the target predicted offset) to travel, so that the first vehicle may have right of way to a certain extent and may actively change a lane based on the decision, to improve lane change efficiency of the first vehicle.

Figure 10:
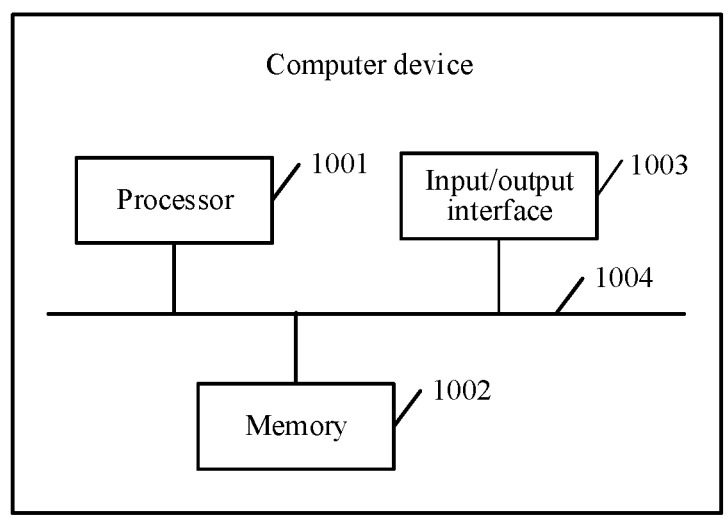
FIG. 10 is a schematic structural diagram of a computer device according to an embodiment of this application.

FIG. 10 is a schematic structural diagram of a computer device according to an embodiment of this application. As shown in FIG. 10, in this embodiment of this application, the computer device may include one or more processors 1001, a memory 1002, and an input/output interface 1003. The processors 1001, the memory 1002, and the input/output interface 1003 are connected through a bus 1004. The memory 1002 is configured to store a computer program, the computer program including program instructions, and the input/output interface 1003 is configured to receive data and output the data. The processor 1001 is configured to invoke the program instructions stored in the memory 1002, to execute the following operations:

determining at least two predicted offsets of a first vehicle, a first traveling state of the first vehicle, and a second traveling state of a second vehicle, the second vehicle being a reference vehicle when the first vehicle changes a lane;

determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state; and determining a predicted yielding probability of the second vehicle, generating target lane change payoffs of the predicted offsets according to the predicted yielding probability and the first lane change payoffs and the second lane change payoffs of the predicted offsets, and determining a predicted offset having a maximum target lane change payoff as a target predicted offset, the target predicted offset being used for representing a lateral lane change traveling distance predicted for the first vehicle.

In some feasible implementations, the processor 1001 may be a central processing unit (CPU). The processor may further be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor and the like.

The memory 1002 may include a read-only memory and a random access memory, and provides the processor 1001 and the input/output interface 1003 with instructions and data. A part of the memory 1002 may further include a non-volatile random access memory. For example, the memory 1002 may further store information about a device type.

In a specific implementation, the computer device may perform the implementations provided in the steps in FIG. 4 through built-in functional modules of the computer device. For details, reference may be made to the implementations provided in the foregoing steps in FIG. 4, and details are not described herein again.

An embodiment of this application provides a computer device, including: a processor, an input/output interface, and a memory. The processor is configured to obtain computer instructions in the memory, to perform the steps in the method shown in FIG. 4, so as to perform the vehicle-based data processing operations. In this embodiment of this application, at least two predicted offsets of a first vehicle, a first traveling state of the first vehicle, and a second traveling state of a second vehicle are determined, the second vehicle being a reference vehicle when the first vehicle changes a lane; first lane change payoffs of the predicted offsets are determined according to the first traveling state and the second traveling state when the second vehicle is in a yielding prediction state, and second lane change payoffs of the predicted offsets are determined when the second vehicle is in a non-yielding prediction state; and a predicted yielding probability of the second vehicle is determined, target lane change payoffs of the predicted offsets are generated according to the predicted yielding probability and the first lane change payoffs and the second lane change payoffs of the predicted offsets, and a predicted offset having a maximum target lane change payoff is determined as a target predicted offset, the target predicted offset being used for representing a lateral lane change traveling distance predicted for the first vehicle. Through the above process, decision-making is performed on the first vehicle (that is, an ego vehicle), the decision being used for representing a possible offset distance (that is, the at least two predicted offsets) of the first vehicle, payoff values of the decisions are obtained, to obtain a decision making the first vehicle generate a maximum payoff, and the first vehicle may be controlled based on the decision (the target predicted offset) to travel, so that the first vehicle may have right of way to a certain extent and may actively change a lane based on the decision, to improve lane change efficiency of the first vehicle.

An embodiment of this application further provides a computer-readable storage medium, storing a computer program, the computer program including program instructions, and the program instructions, when being executed by a processor, implementing the vehicle-based data processing method provided in the steps in FIG. 4. For details, reference may be made to the implementations provided in the steps in FIG. 4, and details are not described herein again. In addition, the description of beneficial effects of the same method is not described herein again. For technical details that are not disclosed in the embodiments of the computer-readable storage medium of this application, refer to the method embodiments of this application. In an example, the program instructions may be deployed to be executed on a computer device, or deployed to be executed on a plurality of computer devices at the same location, or deployed to be executed on a plurality of computer devices that are distributed in a plurality of locations and interconnected by using a communication network.

The computer-readable storage medium may be the vehicle-based data processing apparatus provided in any of the foregoing embodiments or an internal storage unit of the computer device, for example, a hard disk or an internal memory of the computer device. The computer-readable storage medium may also be an external storage device of the computer device, such as a plug-in hard disk, a smart media card (SMC), a secure digital (SD) card, or a flash card that is equipped on the computer device. Further, the computer-readable storage medium may also include an internal storage unit of the computer device and an external storage device. The computer-readable storage medium is configured to store the computer program and another program and data that are required by the computer device. The computer-readable storage medium may be further configured to temporarily store data that has been outputted or data to be outputted.

An embodiment of this application further provides a computer program product or a computer program, including computer instructions stored in a computer-readable storage medium. A processor of a computer device reads the computer instructions from the computer-readable storage medium, and executes the computer instructions, so that the computer device performs the method provided in the example manners in FIG. 4, to determine a target predicted offset of a first vehicle and control the first vehicle to travel along a predicted offset track determined based on the target predicted offset, thereby improving lane change efficiency of the first vehicle.

In the specification, claims, and accompanying drawings of the embodiments of this application, the terms "first", "second", or the like are intended to distinguish between different objects but do not indicate a particular order. In addition, the terms "include" and any variant thereof are intended to cover a non-exclusive inclusion. For example, a process, method, apparatus, product, or device that includes a series of steps or units is not limited to the listed steps or modules; and instead, further includes a step or module that is not listed, or further includes another step or unit that is intrinsic to the process, method, apparatus, product, or device.

A person of ordinary skill in the art may be aware that, in combination with examples of units and algorithm steps described in the embodiments disclosed in this specification, this application may be implemented by using electronic hardware, computer software, or a combination thereof. To clearly describe interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The method and the related apparatus provided in the embodiments of this application are described with reference to method flowcharts and/or schematic structural diagrams provided in the embodiments of this application. Specifically, computer program instructions may be used to implement each process and/or each block in the method flowcharts and/or the schematic structural diagrams and a combination of a process and/or a block in flowcharts and/or block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable data processing device to work in a specific manner, so that the instructions stored in the computer-readable memory generate an artifact that comprises an instruction apparatus. The instruction apparatus implements a specific function in one or more procedures in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What is disclosed above is merely exemplary embodiments of this application, and certainly is not intended to limit the scope of the claims of this application. Therefore, equivalent variations made in accordance with the claims of this application shall fall within the scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A vehicle-based data processing method performed by a computer device, the method comprising:
   determining at least two predicted offsets of a first vehicle moving on a first lane, a first traveling state of the first vehicle, and a second traveling state of a second vehicle, the second vehicle being a reference vehicle moving in a same direction as the first vehicle on a second lane next to the first lane, wherein the second vehicle is behind the first vehicle when the first vehicle changes from the first lane to the second lane;
   determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state;
   determining a predicted yielding probability of the second vehicle, generating target lane change payoffs of the predicted offsets according to the predicted yielding probability, and the first lane change payoffs and the second lane change payoffs of the predicted offsets, and determining a predicted offset having a maximum target lane change payoff as a target predicted offset, the target predicted offset being used for representing a lateral lane change traveling distance predicted for the first vehicle;
   determining a predicted offset track according to the target predicted offset and the second lane in which the second vehicle is located, a lateral traveling distance corresponding to the predicted offset track in the first lane and the second lane being the target predicted offset; and
   controlling the first vehicle to travel along the predicted offset track from the first lane to the second lane.

2. The method according to claim 1, wherein the determining at least two predicted offsets of a first vehicle comprises:
   determining a lane width of the lane and a quantity of decisions; and
   determining a horizontal distance between the first vehicle and a lane line of a first lane in which the first vehicle is located, and determining the at least two predicted offsets of the first vehicle based on the lane width, the horizontal distance, and the quantity of decisions.

3. The method according to claim 1, further comprising:
   determining the first lane in which the first vehicle is located, and establishing a road coordinate system by using a center line of the first lane as a coordinate longitudinal axis, a point on the coordinate longitudinal axis to which the first vehicle is mapped as a coordinate origin, and a normal line corresponding to the coordinate longitudinal axis as a coordinate horizontal axis; and
   the determining a first traveling state of the first vehicle and a second traveling state of a second vehicle comprises:

determining first position information of the first vehicle in the road coordinate system, and determining the first traveling state of the first vehicle according to the first position information; and determining second position information of the second vehicle in the road coordinate system, and determining the second traveling state of the second vehicle according to the second position information.

4. The method according to claim 1, wherein the first traveling state comprises first position information and the second traveling state comprises second position information; and the determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state comprises:

determining an offset distance of the first vehicle according to the first position information, the offset distance being a distance between the first vehicle and a center line of a first lane in which the first vehicle is located; and obtaining an $i^{th}$ predicted offset from the at least two predicted offsets, determining, according to a difference between the $i^{th}$ predicted offset and the offset distance, a first lane change payoff of the $i^{th}$ predicted offset when the second vehicle is in the yielding prediction state, and determining a second lane change payoff of the $i^{th}$ predicted offset when the second vehicle is in the non-yielding prediction state, i being a positive integer, and i being less than or equal to a quantity of the at least two predicted offsets.

5. The method according to claim 1, wherein the first traveling state comprises first position information and a first traveling speed and the second traveling state comprises second position information and a second traveling speed; and the determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state comprises:

obtaining a first longitudinal coordinate value in the first position information and a second longitudinal coordinate value in the second position information, and determining a longitudinal time to collision between the first vehicle and the second vehicle according to the first longitudinal coordinate value, the first traveling speed, the second longitudinal coordinate value, and the second traveling speed;

obtaining a first horizontal coordinate value in the first position information and a second horizontal coordinate value in the second position information, obtaining an $i^{th}$ predicted offset, and determining a traffic lateral distance corresponding to the $i^{th}$ predicted offset according to the first horizontal coordinate value, the second horizontal coordinate value, and the $i^{th}$ predicted offset, i being a positive integer, and i being less than or equal to a quantity of the at least two predicted offsets; and determining, according to the longitudinal time to collision and the traffic lateral distance corresponding to the $i^{th}$ predicted offset, a first lane change payoff of the $i^{th}$ predicted offset when the second vehicle is in the yielding prediction state, and determining a second lane change payoff of the $i^{th}$ predicted offset when the second vehicle is in the non-yielding prediction state.

6. The method according to claim 1, wherein the first traveling state comprises first position information and a first traveling speed and the second traveling state comprises second position information and a second traveling speed; and the determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state comprises:

determining third position information of a third vehicle, and determining a lead longitudinal distance between the second vehicle and the third vehicle according to the second position information and the third position information, the second vehicle and the third vehicle being in a same lane, and the third vehicle and the second vehicle being in a same traveling direction;

determining a third traveling speed of the third vehicle; and determining an $i^{th}$ yielding distance of the second vehicle according to an $i^{th}$ predicted offset and the lead longitudinal distance, determining, based on the second traveling speed, the third traveling speed, and the $i^{th}$ yielding distance, a first lane change payoff of the $i^{th}$ predicted offset when the second vehicle is in the yielding prediction state, and determining a second lane change payoff of the $i^{th}$ predicted offset when the second vehicle is in the non-yielding prediction state, i being a positive integer, i being less than or equal to a quantity of the at least two predicted offsets, the $i^{th}$ yielding distance being a distance between the second vehicle and the third vehicle increased based on the lead longitudinal distance under the $i^{th}$ predicted offset when the second vehicle is in the yielding prediction state.

7. The method according to claim 1, wherein the determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state comprises:

obtaining a yielding probability model;

inputting the first traveling state, the second traveling state, and an $i^{th}$ predicted offset into the yielding probability model, to obtain a probability of the yielding prediction state and a probability of the non-yielding prediction state that correspond to the $i^{th}$ predicted offset, i being a positive integer, and i being less than or equal to a quantity of the at least two predicted offsets;

determining the probability of the yielding prediction state as a first lane change payoff of the $i^{th}$ predicted offset when the second vehicle is in the yielding prediction state; and determining the probability of the non-yielding prediction state as a second lane change payoff of the $i^{th}$ predicted offset when the second vehicle is in the non-yielding prediction state.

8. The method according to claim 1, wherein the determining a predicted yielding probability of the second vehicle comprises:

obtaining historical longitudinal times to collision and historical distances to collision corresponding to the historical longitudinal times to collision, and determining a time to collision average value and a time to collision standard deviation according to the historical longitudinal times to collision and the historical distances to collision;

determining a longitudinal time to collision between the second vehicle and the first vehicle, and mapping the longitudinal time to collision to a first probability density function generated by the time to collision average value and the time to collision standard deviation, to determine an initial yielding probability of the second vehicle according to the first probability density function;

obtaining historical traffic lateral distances, and determining a distance average value and a distance standard deviation according to the historical traffic lateral distances;

determining a traffic lateral distance between the second vehicle and the first vehicle, and mapping the traffic lateral distance to a second probability density function generated by the distance average value and the distance standard deviation, to determine a traveling keeping probability of the second vehicle according to the second probability density function; and determining the predicted yielding probability of the second vehicle according to the initial yielding probability and the traveling keeping probability.

9. The method according to claim 1, wherein the generating target lane change payoffs of the predicted offsets according to the predicted yielding probability, and the first lane change payoffs and the second lane change payoffs of the predicted offsets comprises:

constructing a decision tree, decision boundaries in the decision tree comprising the at least two predicted offsets, the yielding prediction state, and the non-yielding prediction state, and tree nodes in the decision tree comprising the first vehicle and the second vehicle;

performing weighted summation on the first lane change payoffs and the second lane change payoffs of the predicted offsets layer by layer in at least two decision layers of the decision tree according to the predicted yielding probability and the decision boundaries until tree payoff values of the predicted offsets in a root node of the decision tree are obtained; and determining the tree payoff values of the predicted offsets in the root node as the target lane change payoffs of the predicted offsets.

10. The method according to claim 9, wherein the at least two decision layers in the decision tree comprise a decision layer k1 and a decision layer k2, the decision layer k1 comprising the root node; the first traveling state comprises a first actual traveling state and a first predicted traveling state, and the second traveling state comprises a second actual traveling state and a second predicted traveling state; the first lane change payoffs comprise first lane change payoffs in the decision layer k1 and first lane change payoffs in the decision layer k2, and the second lane change payoffs comprise second lane change payoffs in the decision layer k1 and second lane change payoffs in the decision layer k2; and the determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state comprises:

determining, according to the first actual traveling state and the second actual traveling state, the first lane change payoffs of the predicted offsets in the decision layer k1 when the second vehicle is in the yielding prediction state, and determining the second lane change payoffs of the predicted offsets in the decision layer k1 when the second vehicle is in the non-yielding prediction state;

predicting the first predicted traveling state of the first vehicle according to the first actual traveling state, and predicting the second predicted traveling state of the second vehicle according to the second actual traveling state; and determining, according to the first predicted traveling state and the second predicted traveling state, the first lane change payoffs of the predicted offsets in the decision layer k2 when the second vehicle is in the yielding prediction state, and determining the second lane change payoffs of the predicted offsets in the decision layer k2 when the second vehicle is in the non-yielding prediction state.

11. The method according to claim 10, wherein the predicted yielding probability comprises a predicted yielding probability in the decision layer k1 and a predicted yielding probability in the decision layer k2; and the performing weighted summation on the first lane change payoffs and the second lane change payoffs of the predicted offsets layer by layer in at least two decision layers of the decision tree according to the predicted yielding probability and the decision boundaries until tree payoff values of the predicted offsets in a root node of the decision tree are obtained comprises:

performing weighted summation on the first lane change payoffs and the second lane change payoffs of the predicted offsets in the decision layer k2 according to the predicted yielding probability in the decision layer k2, to obtain tree payoff values of the predicted offsets in the decision layer k2;

determining a maximum tree payoff value in the tree payoff values of the predicted offsets in the decision layer k2 as a parameter value of the decision layer k2; and performing weighted summation on the parameter value of the decision layer k2 and the first lane change payoffs and the second lane change payoffs of the predicted offsets in the decision layer k1 according to the predicted yielding probability in the decision layer k1, to obtain tree payoff values of the predicted offsets in the decision layer k1, the tree payoff values of the predicted offsets in the decision layer k1 being tree payoff values of the predicted offsets in the root node of the decision tree.

12. A computer device, comprising a processor, a memory, and an input/output interface, the processor being respectively connected to the memory and the input/output interface, the input/output interface being configured to receive data and output the data, the memory being configured to store a computer program, and the processor being configured to invoke the computer program, to perform a vehicle-based data processing method including:

determining at least two predicted offsets of a first vehicle moving on a first lane, a first traveling state of the first vehicle, and a second traveling state of a second vehicle, the second vehicle being a reference vehicle moving in a same direction as the first vehicle on a second lane next to the first lane, wherein the second vehicle is behind the first vehicle when the first vehicle changes from the first lane to the second lane;

determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state;

determining a predicted yielding probability of the second vehicle, generating target lane change payoffs of the predicted offsets according to the predicted yielding probability, and the first lane change payoffs and the second lane change payoffs of the predicted offsets, and determining a predicted offset having a maximum target lane change payoff as a target predicted offset, the target predicted offset being used for representing a lateral lane change traveling distance predicted for the first vehicle;

determining a predicted offset track according to the target predicted offset and the second lane in which the second vehicle is located, a lateral traveling distance corresponding to the predicted offset track in the first lane and the second lane being the target predicted offset; and controlling the first vehicle to travel along the predicted offset track from the first lane to the second lane.

13. The computer device according to claim 12, wherein the determining at least two predicted offsets of a first vehicle comprises:

determining a lane width of the lane and a quantity of decisions; and determining a horizontal distance between the first vehicle and a lane line of a first lane in which the first vehicle is located, and determining the at least two predicted offsets of the first vehicle based on the lane width, the horizontal distance, and the quantity of decisions.

14. The computer device according to claim 12, wherein the first traveling state comprises first position information and the second traveling state comprises second position information; and the determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state comprises:

determining an offset distance of the first vehicle according to the first position information, the offset distance being a distance between the first vehicle and a center line of a first lane in which the first vehicle is located; and obtaining an $i^{th}$ predicted offset from the at least two predicted offsets, determining, according to a difference between the $i^{th}$ predicted offset and the offset distance, a first lane change payoff of the $i^{th}$ predicted offset when the second vehicle is in the yielding prediction state, and determining a second lane change payoff of the $i^{th}$ predicted offset when the second vehicle is in the non-yielding prediction state, i being a positive integer, and i being less than or equal to a quantity of the at least two predicted offsets.

15. The computer device according to claim 12, wherein the determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state comprises:

obtaining a yielding probability model;

inputting the first traveling state, the second traveling state, and an $i^{th}$ predicted offset into the yielding probability model, to obtain a probability of the yielding prediction state and a probability of the non-yielding prediction state that correspond to the $i^{th}$ predicted offset, i being a positive integer, and i being less than or equal to a quantity of the at least two predicted offsets;

determining the probability of the yielding prediction state as a first lane change payoff of the $i^{th}$ predicted offset when the second vehicle is in the yielding prediction state; and determining the probability of the non-yielding prediction state as a second lane change payoff of the $i^{th}$ predicted offset when the second vehicle is in the non-yielding prediction state.

16. The computer device according to claim 12, wherein the determining a predicted yielding probability of the second vehicle comprises:

obtaining historical longitudinal times to collision and historical distances to collision corresponding to the historical longitudinal times to collision, and determining a time to collision average value and a time to collision standard deviation according to the historical longitudinal times to collision and the historical distances to collision;

determining a longitudinal time to collision between the second vehicle and the first vehicle, and mapping the longitudinal time to collision to a first probability density function generated by the time to collision average value and the time to collision standard deviation, to determine an initial yielding probability of the second vehicle according to the first probability density function;

obtaining historical traffic lateral distances, and determining a distance average value and a distance standard deviation according to the historical traffic lateral distances;

determining a traffic lateral distance between the second vehicle and the first vehicle, and mapping the traffic lateral distance to a second probability density function generated by the distance average value and the distance standard deviation, to determine a traveling keeping probability of the second vehicle according to the second probability density function; and determining the predicted yielding probability of the second vehicle according to the initial yielding probability and the traveling keeping probability.

17. The computer device according to claim 12, wherein the generating target lane change payoffs of the predicted offsets according to the predicted yielding probability, and the first lane change payoffs and the second lane change payoffs of the predicted offsets comprises:

constructing a decision tree, decision boundaries in the decision tree comprising the at least two predicted offsets, the yielding prediction state, and the non-yielding prediction state, and tree nodes in the decision tree comprising the first vehicle and the second vehicle;

performing weighted summation on the first lane change payoffs and the second lane change payoffs of the predicted offsets layer by layer in at least two decision layers of the decision tree according to the predicted yielding probability and the decision boundaries until tree payoff values of the predicted offsets in a root node of the decision tree are obtained; and determining the tree payoff values of the predicted offsets in the root node as the target lane change payoffs of the predicted offsets.

18. A non-transitory computer-readable storage medium, storing a computer program, the computer program comprising program instructions that, when executed by a processor of a computer device, cause the computer device to perform a vehicle-based data processing method including:
   determining at least two predicted offsets of a first vehicle moving on a first lane, a first traveling state of the first vehicle, and a second traveling state of a second vehicle, the second vehicle being a reference vehicle moving in a same direction as the first vehicle on a second lane next to the first lane, wherein the second vehicle is behind the first vehicle when the first vehicle changes from the first lane to the second lane;
   determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state;
   determining a predicted yielding probability of the second vehicle, generating target lane change payoffs of the predicted offsets according to the predicted yielding probability, and the first lane change payoffs and the second lane change payoffs of the predicted offsets, and determining a predicted offset having a maximum target lane change payoff as a target predicted offset, the target predicted offset being used for representing a lateral lane change traveling distance predicted for the first vehicle;
   determining a predicted offset track according to the target predicted offset and the second lane in which the second vehicle is located, a lateral traveling distance corresponding to the predicted offset track in the first lane and the second lane being the target predicted offset; and
   controlling the first vehicle to travel along the predicted offset track from the first lane to the second lane.

19. The non-transitory computer-readable storage medium according to claim 18, wherein the determining at least two predicted offsets of a first vehicle comprises:
   determining a lane width of the lane and a quantity of decisions; and
   determining a horizontal distance between the first vehicle and a lane line of a first lane in which the first vehicle is located, and determining the at least two predicted offsets of the first vehicle based on the lane width, the horizontal distance, and the quantity of decisions.

20. The non-transitory computer-readable storage medium according to claim 18, wherein the first traveling state comprises first position information and the second traveling state comprises second position information; and
   the determining, according to the first traveling state and the second traveling state, first lane change payoffs of the predicted offsets when the second vehicle is in a yielding prediction state, and determining second lane change payoffs of the predicted offsets when the second vehicle is in a non-yielding prediction state comprises:
   determining an offset distance of the first vehicle according to the first position information, the offset distance being a distance between the first vehicle and a center line of a first lane in which the first vehicle is located; and
   obtaining an $i^{th}$ predicted offset from the at least two predicted offsets, determining, according to a difference between the $i^{th}$ predicted offset and the offset distance, a first lane change payoff of the $i^{th}$ predicted offset when the second vehicle is in the yielding prediction state, and determining a second lane change payoff of the $i^{th}$ predicted offset when the second vehicle is in the non-yielding prediction state, i being a positive integer, and i being less than or equal to a quantity of the at least two predicted offsets.

* * * * *